(12) United States Patent
Komuro et al.

(10) Patent No.: US 7,806,991 B2
(45) Date of Patent: *Oct. 5, 2010

(54) LOW LOSS MAGNET AND MAGNETIC CIRCUIT USING THE SAME

(75) Inventors: Matahiro Komuro, Hitachi (JP); Yuichi Satsu, Hitachi (JP); Takao Imagawa, Mito (JP); Katsumi Ishikawa, Hitachinaka (JP); Takeyuki Itabashi, Hitachi (JP); Yuzo Kozono, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 725 days.

This patent is subject to a terminal disclaimer.

(21) Appl. No.: 11/641,765

(22) Filed: Dec. 20, 2006

(65) Prior Publication Data

US 2007/0151632 A1 Jul. 5, 2007

(30) Foreign Application Priority Data

Dec. 22, 2005 (JP) ............................. 2005-368991

(51) Int. Cl.
*H01F 1/053* (2006.01)
*H01F 1/055* (2006.01)
*H01F 1/057* (2006.01)

(52) U.S. Cl. .................... 148/302; 148/301; 148/311; 148/313

(58) Field of Classification Search .................. None
See application file for complete search history.

(56) References Cited

U.S. PATENT DOCUMENTS

| 7,352,184 | B2 * | 4/2008 | Komuro et al. | ............. 324/319 |
| 2002/0153062 | A1 * | 10/2002 | Hasegawa et al. | ........... 148/105 |
| 2006/0022175 | A1 * | 2/2006 | Komuro et al. | ............. 252/500 |
| 2008/0006345 | A1 * | 1/2008 | Machida et al. | ............. 148/120 |
| 2008/0171216 | A1 * | 7/2008 | Komuro et al. | ............. 428/546 |

FOREIGN PATENT DOCUMENTS

JP    2003-282312    10/2003

OTHER PUBLICATIONS

Reading the Periodic Table; http://www.csun.edu/~psk17793/G%20Chemistry/reading_the_periodic_table.htm, Oct. 20, 2002.*

The Periodic Table; http://facstaff.gpc.edu/~pgore/PhysicalScience/Periodic-table.html, Nov. 17, 2006.*

* cited by examiner

*Primary Examiner*—John P Sheehan
(74) *Attorney, Agent, or Firm*—Antonelli, Terry, Stout & Kraus, LLP.

(57) ABSTRACT

A lamellar high resistance layer having resistivity ten times or higher than that of a mother phase containing iron or cobalt is formed and an oxygen content is controlled to 10 to 10000 ppm so that the reliability and residual magnetic flux density are increased.

19 Claims, 5 Drawing Sheets

LOW LOSS MAGNET AND MAGNETIC CIRCUIT USING THE SAME

CLAIM OF PRIORITY

The present application claims priority from Japanese application Ser. No. 2005-368991, filed on Dec. 22, 2005, the content of which is hereby incorporated by reference into this application.

DESCRIPTION OF THE INVENTION

1. Field of the Invention

The present invention relates to a magnetic powder, a low loss magnet and a magnetic circuit using the magnet.

2. Prior Art

The patent publication No. 1 discloses a sintered magnet of rare earth elements containing fluorine compounds. The magnet has a grain boundary phase of fluorine compounds and the size of the grains of the grain boundary phase is several µm.

Patent document: Japanese patent laid-open 2003-282312

Table 1 in the prior art shown in the patent document No. 1 discloses magnetic properties of sintered magnets prepared by adding $DyF_3$ as a fluorine compound and NdFeB powder for a sintering magnet to the magnet. When 5% by weight of DyF3 is added, a residual magnetic flux density (Br) is 11.9 kG, which is smaller by about 9.8% than that (13.2 kG) of the magnet to which no $DyF_3$ is added. Because of the reduction in the residual magnetic flux density, an energy product $(BH_{max})$ of the magnet reduces drastically. Accordingly, though the coercive force increases, it is difficult to use the magnet in magnetic circuits that need high magnetic flux density or electric rotating machines that need high torque.

SUMMARY OF THE INVENTION

The present invention provides high resistance magnets, magnetic powder for the magnets, magnetic circuits and methods for increasing the interface between the fluorine compounds and the mother phase by forming fluorine compound plates in the grain boundary, thinning a thickness of the fluorine compound plates or making the fluorine compounds to a ferromagnetic phase.

Generally, the present invention provides a magnet having a lamellar grain boundary phase layer on a surface or at the lamellar grain boundary of a mother phase containing iron or cobalt, wherein the grain boundary layer has an electric resistivity of ten times or more that of the mother phase, a hardness of the lamellar grain boundary is smaller than that of the mother phase, and a concentration of oxygen in the mother phase and the lamellar grain boundary phase is 10 to 10000 ppm.

EXPLANATION OF REFERENCE NUMERALS

Figure 1:
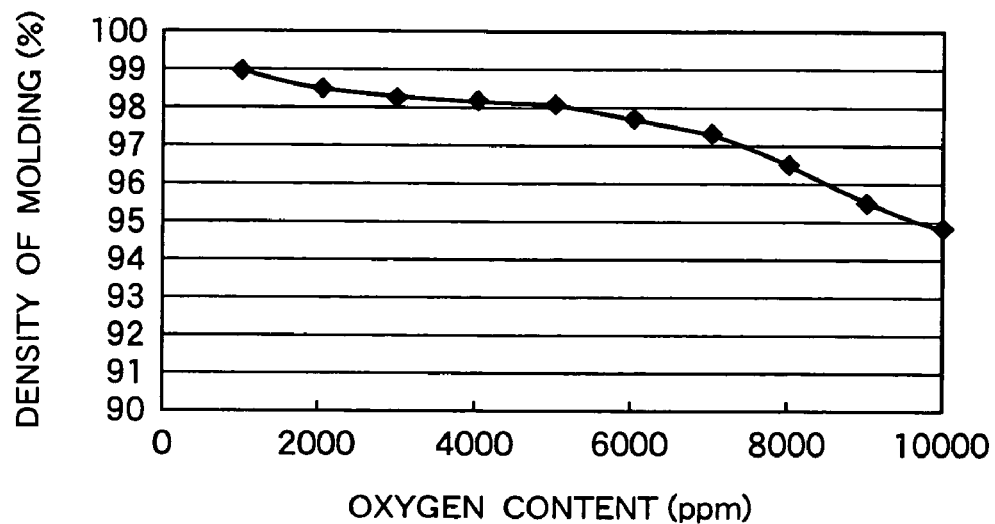
FIG. 1 shows relationship between oxygen content and density of moldings according to embodiment 2.

1; permanent magnet, 2; stator, 3; rotor shaft, 4; teeth, 5; core back, 6; stator iron core, 7; slot, 8; winding, 9; shaft bore, 10; rotor insertion bore, 101; silicon steel plate, 102; soft magnetic material.

DETAILED DESCRIPTION OF THE INVENTION

In the above-mentioned two means, methods of forming plates of flakes of the fluorine compounds on the surface of the magnetic powder are useful. Japanese patent laid-open 2003-282312 discloses a mixing method of $NdF_3$ powder of an average particle size of 0.2 micrometer and NdFeB alloy powder in an automatic mortar. There is no description of shapes of the fluorine compounds; a shape of the compounds after sintering is lump.

On the other hand, in the present invention the fluorine compounds are formed in a layer on magnetic powder by a surface treatment. The surface treatment employs coating fluorine compounds containing at least one of the alkaline earth metals or rare earth elements on the magnetic powder. In this method gelatinous fluorine compounds are ground in an alcoholic solvent and after the ground compounds are coated on the magnetic powder, the solvent is removed by heating. The solvent is removed by heating at 200 to 400° C., and during heating at 500 to 800° C., oxygen, rare earth elements and constituting elements of the fluorine compounds diffuse between the fluorine compounds and the magnetic powder.

For the heat treatment, there are resistance heating furnaces, infrared ray heating furnaces, high frequency induction heating furnaces; in addition to that, mili-wave heating furnaces can be used. In using the mili-wave furnaces, materials are selected so that a high resistance layer formed on the magnetic powder more easily generates heat than the magnetic powder. That is, the materials are selected so that induction loss of the high resistance layer is larger than that of the magnetic powder so that only the high resistance layer is heated easily than the magnetic powder thereby to progress diffusion.

The magnetic powder normally contains oxygen and other impurities such as H, C, P, Si, Al, etc. Oxygen contained in the magnetic powder is present not only as oxides of rare earth elements or of light elements such as Si, Al, but also as phases containing oxygen from compositions, which are apart from a stoichiometric composition in the mother phase or grain boundary. The phase containing oxygen lowers magnetization of the magnetic powder and gives an influence on a shape of magnetization curve, which leads to reduction in a value of residual magnetic flux density, reduction in magnetic field isotropy, reduction in rectangularity of demagnetization curve, reduction in coercive force, an increase in irrevocable demagnetization rate, an increase in thermal demagnetization, fluctuation of magnetization, lowering of anti-corrosion property, reduction in mechanical strength, etc. This results in lowering of reliability of magnets. Since oxygen gives influence on many magnetic properties, it has been considered not to remain in the magnetic powder during preparation processes.

When fluorine compounds are formed in the magnetic powder containing oxygen and the magnetic powder is heated at about 350° C., diffusion of oxygen takes place. Though oxides of the magnetic powder normally react with rare earth elements in the magnetic powder, the oxygen diffuses into the fluorine compounds upon heating thereby to form oxy-fluorine compounds (oxygen migrates into part of the fluorine compounds).

Since the oxy-fluorine compounds are more brittle than the fluorine compounds, peeling-off from the magnetic powder take place easily. This is because the resulting compounds are hard to change their hardness, which is caused by diffusion of oxygen into the fluorine compounds. AS a result, cracks around the fluorine compounds are easily produced thereby to deteriorate molding property so that densification becomes difficult.

Accordingly, control of oxygen concentration of the magnetic powder is important in forming the high resistance layer in the surface of the magnetic powder. That is, the oxygen concentration in the magnetic powder on which the fluorine compounds are formed should be 500 ppm or less. When the oxygen concentration of the magnetic powder is higher than that concentration, a part of the fluorine compounds may be changed to the oxy-fluorine compounds so that the oxy-fluorine compounds easily peel off at the time of post-treatment after molding and cracks are produced.

Further, oxides and fluorides tend to be formed at the interfaces between the magnetic powder and the fluorine compounds thereby to lower the molding property. Instead of the surface treatment, it is possible to form fluorine atoms and rare earth elements sputtered from a target in the surface of the magnetic powder by sputtering under a reduced pressure. Because the fluorine compounds and oxy-fluorine compounds have a face-centered cubic lattice and the lattice constant is 0.54 to 0.60 nm. If the oxygen is removed from the magnetic powder in the grown crystals of fluorine compounds and oxy-fluorine compounds, there are such advantages as an increase in residual magnetic flux density, coercive force, rectangularity of demagnetization curve, thermal demagnetization property, magnetization, anisotropic property, anti-corrosion property, etc.

However, an excess amount of oxygen that tends to combine with the rare earth elements may bring about reduction in residual magnetic flux density, coercive force, rectangularity of demagnetization curve, thermal demagnetization property, magnetization, anisotropic property, anti-corrosion property, etc. These phenomena are observed not only in the fluorine compounds as the high resistance layer, but in other deformable high resistance layers. The deformable high resistance layers are a high resistance layer having a low hardness than that of the mother phase at room temperature, which contain fluorine compounds, oxy-fluorine compounds, and fluorine compounds mixed with nitrides and carbides. When the molding is conducted at high temperatures, it is preferable that the hardness of the high resistance layer is lower than that of the mother phase at molding temperatures; materials for the high resistance layer and the mother phase are selected, based on dependency of hardness on temperature.

When the present invention is employed, a high resistance magnet with high coercive force and high residual magnetic flux density has been realized. It is possible to improve molding property by controlling an amount of oxygen.

DETAILED DESCRIPTION OF THE PREFERRED EMBODIMENTS

In the following there are described embodiments of the present invention.

Embodiment 1

Fe alloy powder having an average particle size of 1-10 μm was prepared by grinding to which a layer containing fluorine was formed by sputtering $NdF_3$ using a target formed of $NdF_3$ powder in an argon gas or a nixed gas of argon and fluorine gas. Before sputtering, the surface was subjected to cleaning by reverse sputtering to remove an oxide layer on the surface thereby to lower the oxygen content to 300 ppm or less.

Vibration or rotation movement was imparted to the Fe alloy powder to form fluoride or a layer containing fluorine on the whole surface of the powder. There is on the surface of the Fe alloy powder a phase of 1 to 10 nm, which is different in a composition from that of the mother phase. The thicknesses of the phase and the oxide layer are locally different; when the powder is not homogeneous, the thicknesses are 10 to 100 nm.

The layer containing fluorine on the surface of the powder has a thickness of 1 to 10 nm or more, which is equal to that of the rare earth elements; when a heat treatment at 600° C. or higher is conducted to lower the loss after formation of the layer containing fluorine, it is preferable to make the thickness thin. The oxide layer and the rare earth element layer tend to diffuse with the layer containing fluorine at 600° C. or higher to change the structure of the layer containing fluorine. As a result, the continuity and the crystalline structure are not maintained when the thickness is too small by invasion of defects or oxygen and diffusion of rare earth elements at around the interface of the layer containing fluorine. Therefore, the concentration of oxygen in powder to which the fluorides are introduced is preferably 500ppm or less. The layer containing fluorine prepared by sputtering or the like is a mixed phase of $NdF_2$ containing amorphous $NdF_3$ and $NdF_{2-x}$ immediately after formation by sputtering or the like; it is possible to form a fluorine containing layer made only of amorphous phase, $NdF_3$ or $NdF_2$ by controlling the formation conditions.

After the fluorine containing layer is formed, heat treatment at 600 to 800° C. is conducted. In this treatment, structures of the fluorine containing layer and a phase in contact with the layer drastically change. The layer different in a composition of the rare earth elements from the mother phase grows as the heat treatment temperature elevates; oxygen in diffuses into the fluorine containing layer and the layer different in the rare earth element composition. When the oxygen concentration is high, the magnetic properties decrease as the thickness increases. Therefore, the thickness of the fluorine-containing layer is determined based on required magnetic properties.

The fluorine-containing layer can be formed along the surface of the powder, a thickness distribution of the layer being +200%, −50% (a thickness distribution is 0.5 to 2 times the average value of the thickness). In molding the powder on which the fluorine containing layer is formed, if the oxygen concentration exceeds 500 ppm, the hardness of the fluorine containing layer increases so that the powder becomes hard to be deformed and a high density molding is not obtained. In order to reduce an eddy current loss, a resistance of the fluorine-containing layer is preferably 10 times or more that of the mother phase. Since the rare earth element compounds exhibit resistance ten times or more that of the mother phase of Fe alloy and a hardness can be made can be made substantially equal to that of the Fe alloy, the loss of the Fe alloy powder can be reduced by controlling the oxygen concentration to 5000 ppm or less.

Embodiment 2

Fe—Co alloy powder was prepared by grinding the alloy to an average particle size of 1 to 10 μm. $CaF_2$ was sputtered on the surface of the Fe—Co alloy. A content of Co in the alloy is 1-30 atomic %. A target was $CaF_2$. Sputtering was carried out in an argon gas or a mixed gas atmosphere of argon and fluorine gas to form a fluorine-containing layer on the Fe—Co alloy powder. Before sputtering of the fluoride, the surface of the powder was subjected to cleaning by reverse sputtering, etc. to remove an oxide layer so that an oxide concentration of the Fe—Co alloy powder became 3000 ppm or less.

Vibration or rotating force was imparted to the Fe—Co alloy powder to form fluoride or the fluorine-containing layer on the whole surface of the powder. There is a phase having a thickness of 1 to 10 nm, on the surface of the powder, different in the composition from that of the mother phase and normally an oxide layer around the phase.

The thickness of the fluorine containing layer on the powder surface should be 1 to 10 nm; after the formation of the fluorine containing layer, the thickness should be made small when the heat treatment at 400° C. or higher is applied to reduce the loss. Since the oxide layer tends to diffuse with the fluorine containing layer each other at 400° C. or higher thereby to change the structure of the fluorine containing layer, the interface and the vicinity thereof of the fluorine containing layer can not maintain the continuity and crystalline structure by invasion of defects or oxygen or diffusion of Ca, when the thickness is too thin. Accordingly, it is preferable to control the oxygen concentration of the powder on which the fluoride is formed to 5000 ppm or less.

The fluorine containing layer just after formation by sputtering or the like is a mixed phase of $CaF_2$ containing an amorphous structure and $CaF_{2-x}$ and oxy-fluorides; by controlling the conditions of formation, it is possible to produce a fluorine containing layer only of amorphous structure, $CaF_2$, or $CaF_{2-x}$.

After the fluorine containing layer is formed, a heat treatment at 400 to 900° C. is conducted. By this heat treatment, the structure of a layer in contact with the fluorine-containing layer greatly changes. Oxygen in the oxide layer can diffuse into both of the fluorine containing layer and Fe—Co alloy layer. When the oxygen concentration is high, magnetic properties decrease as the thickness increases. Thus, the thickness of the fluorine-containing layer is determined by required magnetic properties.

The fluorine-containing layer can be formed along the surface of the powder; a thickness distribution is within a range of +200%, −50%.

In case of molding the powder having the fluorine containing layer at a temperature of 900° C. or lower, it is difficult to produce a high density molding if the oxygen concentration is 5000 ppm or more so that the hardness of the fluorine containing layer becomes high and is hard to be deformed. As a result, a high density molding is not obtained.

In order to reduce the eddy current loss, the resistance of the fluorine-containing layer should preferably be 10 times or more of the resistance of the mother phase. $CaF_2$ exhibits resistance of ten times or more of the mother phase and hardness of the $CaF_2$ can be made smaller than that of the Fe—Co alloy. The oxygen concentration of 5000 ppm or less makes the loss of the Fe—Co alloy molding being reduced.

Embodiment 3

A treating solution for a neodymium-fluorine compound coating was prepared in the following manner.

(1) 4 grams of Nd acetate or Nd nitrate, which is a salt well soluble in water, was added to about 400 mL of water, and the compound was completely dissolved by means of a shaker or ultrasonic stirrer.

(2) Hydrofluoric acid of about 10% was slowly added to the solution at such an equivalent rate that $NdF_3$ is produced by a chemical reaction.

(3) The resulting solution containing gel state precipitate of $NdF_3$ was stirred by an ultrasonic solution stirrer for more than one hour.

(4) The solution was subjected to centrifugation at a rotation number of 4000 r.p.m.; then, after the supernatant was removed, almost the same amount of methanol was added.

(5) After the methanol solution containing gel state $NdF_3$ was subjected to stirring to make it a suspension solution, it was stirred by the ultrasonic stirrer for more than one hour.

(6) The step (4) and step (5) were repeated 4 times until acetate ions or nitrate ions were not detected.

(7) The resulting sol state was obtained after treatment with methanol solution containing $NdF_3$ of 1 g/15 mL.

As rare earth magnetic powder NdFeB alloy powder was employed. This magnetic powder has an average particle size of 100-200 μm and magnetic anisotropy. A process for forming rare earth element fluorine compounds or alkaline earth metal fluorine compound film on the rare earth element magnetic powder was carried out in the following manner.

(1) 10 mL of a $NdF_3$ coating film treatment liquid was added to 100 grams of the rare earth element magnetic powder having an average particle size of 100 μm, and the mixture was mixed until the whole of the rare earth magnetic powder was wetted.

(2) The resulting $NdF_3$ coated rare earth magnetic powder was subjected to methanol removing treatment under a reduced pressure of 2-5 torr.

(3) The rare earth magnetic powder from which methanol solvent was removed at (2) was charged in a quartz boat; then, it was subjected to heat treatment under a reduced pressure of $1 \times 10^{-5}$ torr at 200° C. for 30 minutes and at 400° C. for 30 minutes.

(4) After the resulting magnetic powder at (3) was transferred to a porous alumina vessel, it was heated by a mili-wave at 400 to 800° C. under a reduced pressure of $1 \times 10^{-5}$ torr.

(5) As the mili-wave heating apparatus, a 28 GHz mili-wave heating apparatus manufactured by Fuji Dempa Industries was used at an output of 1-10 kW in an argon atmosphere at 200° C. to selectively heat the $NdF_3$ coating.

(6) Magnetic properties of the resulting magnetic powder at (5) were investigated.

The magnetic properties are shown in Table 1 below.

TABLE 1

| Magnetic powder | Coating Film | Coating thickness (nm) | Oxygen content (ppm) | Residual magnetic flux density (T) | Coercive force (kOe) | Resistance ($\Omega$) |
|---|---|---|---|---|---|---|
| NdFeB | $NdF_3$ | 10 | 5000 | 1.1 | 15.5 | >M$\Omega$ |
| NdFeB | $NdF_3$ | 10 | 4000 | 1.1 | 15.6 | >M$\Omega$ |
| NdFeB | $NdF_3 + NdF_2$ | 20 | 5000 | 1.1 | 15.6 | >M$\Omega$ |
| NdFeB | $NdF_3 + NdF_2 + NdOF$ | 20 | 6000 | 0.9 | 14.5 | >M$\Omega$ |
| NdFeB | $NdF_3 + NdF_2 + NdOF$ | 40 | 6000 | 0.8 | 14.1 | >M$\Omega$ |

When $NdF_3$ is formed on NdFeB alloy powder of a low oxygen concentration in the manner mentioned above, $NdF_2$ and $NdF_3$ grow around the interface, and an amount of NdOF is smaller than those of the fluorides. Controlling the formation of the oxy-fluoride compound prevents peeling-off of fluorides on the surface of NdFeB powder and prevents dropping out of the fluoride layer when a stress is imparted to NdFeB powder.

Though oxygen tends to invade into rare earth element fluoride compounds as an impurity, when the oxygen content in the magnetic powder exceeds 5000 ppm, oxy-fluoride compound is easily formed thereby to be peeled off from the magnetic powder. When the oxygen content is large, mechanical properties of the fluoride compounds change and high densification becomes difficult at the time of compression molding at high temperature under pressure.

Figure 2:
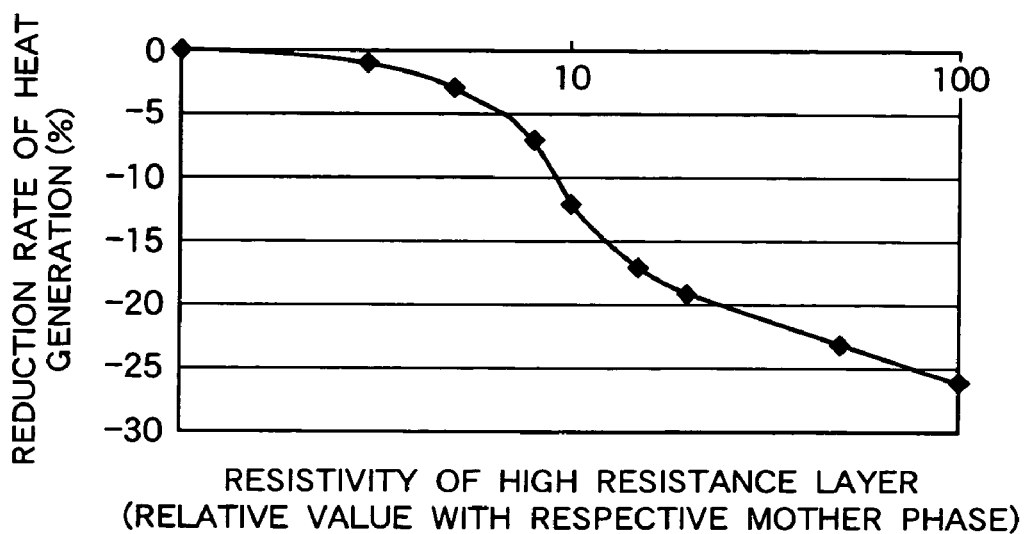
FIG. 2 shows relationship between relative resistance values and reduction rate in heat generation according to embodiment 4.

FIG. 1 shows the relationship between density and oxygen content of moldings of 10×10×10 $mm^3$, which were molded under a load of 10 tons at 700° C. The figure shows that when the oxygen content exceeds 5000 ppm, the density becomes less than 98%, the high densification being difficult. Further, resistance of the high resistance layer changes depending on the oxygen contents, and when the resistance of the high resistance layer is ten times or more of that of the mother phase, reduction in the loss becomes 10% or more as shown in FIG. 2.

The loss was evaluated by applying high frequency magnetic flux to the magnet molded so that the density of the molding with a high resistance layer of 1000 nm becomes 98% after the surface treatment. In order to reduce the loss, the resistance of the high resistance layer should be 10 times or more. Therefore, the oxygen content must be lowered. In order to lower the oxygen content, it is important to prevent incorporation of oxygen and moisture during the surface treatment for fluorine compound growth.

The magnetic powder having the fluorine compound layer is mixed with organic resins such as epoxy resin, polyimide resin, polyamide resin, polyamide-imide resin, Kelimide resin, maleimide resin, polyphenyl ether, polyphenylenesulfide, or its mixture with epoxy resin, polyimide resin, polyamide resin, polyamide-imide resin, kelimide resin or maleimide resin to prepare compounds. The compounds are molded in a magnetic field or under no magnetic field thereby to produce bond moldings.

It is possible to produce the bond moldings with anisotropy imparted by applying magnetic field at the time of molding, when anisotropic magnetic powder is used as NdFeB alloy powder.

Embodiment 4

A treating solution for forming neodymium fluoride compound coating film was prepared in the following manner.

(1) 4 grams of Nd acetate or Nd nitrate, which is a salt well soluble in water, was added to about 400 mL of water, and the compound was completely dissolved by means of a shaker or ultrasonic stirrer.

(2) Hydrofluoric acid of about 10% was slowly added to the solution at such an equivalent rate that $NdF_3$ is produced by a chemical reaction.

(3) The resulting solution containing gel state precipitate of $NdF_3$ was stirred by an ultrasonic solution stirrer for more than one hour.

(4) The solution was subjected to centrifugation at a rotation number of 4000 r.p.m.; then, after the supernatant was removed, almost the same amount of methanol was added.

(5) After the methanol solution containing gel state $NdF_3$ was subjected to stirring to make it a suspension solution, it was stirred by the ultrasonic stirrer for more than one hour.

(6) The step (4) and step (5) were repeated 4 times until acetate ions or nitrate ions were not detected.

(7) The resulting sol state was obtained after treatment with methanol solution containing $NdF_3$ of 1 g/15 mL.

Then, as rare earth magnet block, sintered NdFeB group magnet was employed. This magnet has an average particle size of 1 to 50 μm and magnetic anisotropy. A process for forming rare earth element fluorine compounds or alkaline earth metal fluorine compound film on the rare earth element magnet block was carried out in the following manner.

(1) 1 mL of the NdF3 coating film treatment liquid was added to 100 grams of the rare earth element magnet, and the mixture was mixed until the whole of the rare earth magnet was wetted.

(2) The resulting $NdF_3$ coated rare earth magnet was subjected to methanol removing treatment under a reduced pressure of 2-5 torr.

(3) The rare earth magnet from which methanol solvent was removed at (2) was charged in a quartz boat; then, it was subjected to heat treatment under a reduced pressure of $1\times10^{-5}$ torr at 200° C. for 30 minutes and at 400° C. for 30 minutes.

(4) After the rare earth resulting magnet at (3) was transferred to a porous alumina vessel, it was heated by a mili-wave at 300 to 1200° C. under a reduced pressure of $1\times10^{-5}$ torr.

(5) As the mili-wave heating apparatus, a 28 GHz mili-wave heating apparatus manufactured by Fuji Dempa Industries was used at an output of 1-10 kW in an argon atmosphere at 200° C. to selectively heat the $NdF_3$ coating.

(6) Magnetic properties of the resulting magnetic powder at (5) were investigated. Magnetic properties are shown in FIG. 2.

TABLE 2

| Magnet block | Coating film | Coating thickness (nm) | Oxygen content (ppm) | Residual magnetic flux density (T) | Coercive force (kOe) | Resistance (Ω) |
|---|---|---|---|---|---|---|
| NdFeB | $NdF_3$ | 10 | 10000 | 1.2 | 30.2 | >kΩ |
| NdFeB | $NdF_3$ | 10 | 15000 | 0.9 | 18.5 | >kΩ |
| NdFeB | $DyF_3$ | 20 | 10000 | 1.1 | 32.5 | >kΩ |
| NdFeB | $TbF_3$ | 20 | 10000 | 1.1 | 33.9 | >kΩ |
| NdFeB | $NdF_3 + DyF_3$ | 40 | 10000 | 1.1 | 33.5 | >kΩ |
| NdFeB | $DyF_2$ | 40 | 10000 | 1.2 | 30.2 | >kΩ |
| NdFeB | $PrF_2$ | 40 | 15000 | 0.9 | 18.5 | >kΩ |
| NdFeB | $NdF_3 + NdF_2 + DyF_2$ | 100 | 5000 | 1.0 | 31.2 | >kΩ |
| NdFeB | $NdF_3 + NdF_2 + TbF_2$ | 100 | 5000 | 1.0 | 31.5 | >kΩ |
| NdFeB | $NdF_3 + NdF_2 + PrF_2$ | 100 | 5000 | 1.0 | 31.1 | >kΩ |

When $NdF_3$ is formed on the surface of the NdFeB magnet in the above-mentioned manner, $NdF_2$ and $NdF_3$ grow around the interface and an amount of NdOF is smaller than those of the fluorides.

Suppressing the formation of the oxy-fluorine compound by controlling the oxygen content of the magnet to 10000 ppm or less prevents peeling off of the fluorides on the surface of the NdFeB powder and avoids a release of the fluoride layer at the time a stress is imparted to the NdFeB powder.

In order to control the oxygen content to 10000 ppm or less, there are many conditions to be considered, such as reduction of oxygen content in the ground powder, a particle size of the powder, a composition of the powder, pre-sintering conditions, sintering temperatures, the degree of vacuum, etc in the sintering process. Prevention of invasion of water or oxygen into the powder in the fluorine compound forming process after machining the sintered block is also important.

The fluorine compound forming process should be carried out under conditions such as de-humidification or temperature control. The heat treatment for forming the fluorine compound is carried out at 300 to 1200° C. in a reducing gas atmosphere, if desired, to control the oxygen content to 10 to 10000 ppm.

In addition to fluorine compounds of Nd, lamellar structure of LiF, $MgF_2$, $CaF_2$, $ScF_3$, $VF_2$, VF3, $CrF_2$, $CrF_3$, $MnF_2$, $MnF_3$, $FeF_2$, $FeF_3$, $CoF_2$, $CoF_3$, $NiF_2$, $ZnF_2$, $AlF_3$, $GaF_3$, $SrF_2$, $YF_3$, $ZrF_3$, $NbF_5$, AgF, $InF_3$, $SnF_2$, $SnF_4$, $BaF_2$, $LaF_2$, $LaF_3$, $CeF_2$, $CeF_3$, $PrF_2$, $PrF_3$, $Ndf_2$, $NdF_3$, $SmF_2$, $SmF_3$, $EuF_2$, $EuF_3$, $GdF_3$, $TbF_2$, $TbF_3$, $TbF_4$, $DyF_2$, $DyF_3$, $HoF_2$, $HoF_3$, $ErF_2$, $ErF_3$, $TmF_2$, $TmF_3$, $YbF_2$, $YbF_3$, $LuF_2$, $LuF_3$, $PbF_2$, $BiF_3$, their oxy-fluorine compounds, fluorine compounds having a partial fluorine deficit can be formed. Among the fluorine compounds, $NdF_3$ or the like, which have a larger dielectric loss at a high temperature such as 200° C. than NdFeB, generates heat by mili-wave heating so that the fluorine compounds generate heat only at a position where the fluorine compounds are formed.

As a result, the magnetic properties only near the surface layer where the fluorine compounds are formed can be improved without deteriorating internal magnetic properties of NdFeB sintered body. The sintered block body of the worked NdFeB sintered body tends to have a deteriorated layer at the outermost surface where magnetic properties become worse.

In order to recover the deteriorated magnetic properties, fluorine compounds containing elements that make magnetic anisotropy large are molded in the above-mentioned manner; then, the mili-wave heating is conducted to cause the fluorine compounds or oxy-fluorine compounds generate heat thereby to diffuse the rare earth elements only in an area where the fluorine compounds are formed. The diffusion brought about increase in coercive force and rectangularity of NdFeB.

Embodiment 5

A dysprosium fluoride compound coating solution was prepared in the following manner.

(1) 4 grams of Dy acetate or Dy nitrate, which is a salt well soluble in water, was added to about 100 mL of water, and the compound was completely dissolved by means of a shaker or ultrasonic stirrer.

(2) Hydrofluoric acid of about 10% was slowly added to the solution at such an equivalent rate that DyF3 is produced by a chemical reaction.

(3) The resulting solution containing gel state precipitate of DyF3 was stirred by an ultrasonic solution stirrer for more than one hour.

(4) The solution was subjected to centrifugation at a rotation number of 4000 r.p.m.; then, after the supernatant was removed, almost the same amount of methanol was added.

(5) After the methanol solution containing gel state $DyF_3$ was subjected to stirring to make it a suspension solution, it was stirred by the ultrasonic stirrer for more than one hour.

(6) The step (4) and step (5) were repeated 4 times until acetate ions or nitrate ions were not detected.

(7) The resulting sol state $DyF_3$ was obtained after treatment with methanol solution containing $DyF_3$ of 1 g/15 mL.

Thereafter, NdFeB alloy powder and SmCo alloy powder were used for rare earth element magnets. The above process may be applied to Fe alloys containing at least one rare earth element or alloys containing at least one rare earth element and at least one semimetal.

The SmCo alloys contain at least one rare earth element. The above process can be applied to alloys containing various kinds of metals that are added to the SmCo alloys. These magnetic powder have an oxygen content of 10 to 3000 ppm, an average particle size of 1 to 100 μm and magnetic anisotropy.

A solution for forming rare earth element fluorine compound coating or alkaline earth metal fluorine compound on the rare earth element magnet powder was conducted in the following manner.

(1) 15 mL of a $DyF_3$ coating film treatment liquid was added to 100 grams of the rare earth element magnetic powder having an average particle size of 10 μm, and the mixture was kneaded until the whole of the rare earth magnetic powder was wetted.

(2) The resulting DyF$_3$ coated rare earth magnetic powder was subjected to methanol removing treatment under a reduced pressure of 2-5 torr.
(3) The rare earth magnetic powder from which methanol solvent was removed at (2) was charged in a quartz boat; then, it was subjected to heat treatment under a reduced pressure of 1×10$^{-5}$ torr at 200° C. for 30 minutes and at 400° C. for 30 minutes.
(4) After the resulting magnetic powder at (3) was transferred to a porous alumina vessel, it was heated by a mili-wave at 400 to 800° C. under a reduced pressure of 1×10$^{-5}$ torr.
(5) Magnetic properties of the resulting magnetic powder at (4) were investigated. The magnetic properties are shown in Table 3.

TABLE 3

| Magnetic powder | Coating | Coating thickness (nm) | Oxygen content (ppm) | Residual magnetic flux density (T) | Coercive force (kOe) | Resistance (Ω) |
|---|---|---|---|---|---|---|
| NdFeB | DyF$_3$ | 20 | 5000 | 1.1 | 18.5 | >MΩ |
| NdFeB | DyF$_3$ | 20 | 4000 | 1.1 | 19.5 | >MΩ |
| NdFeB | DyF$_3$ + DyF$_2$ | 50 | 5000 | 1.1 | 21.5 | >MΩ |
| NdFeB | DyF$_3$ + DyF$_2$ + DyOF | 50 | 6000 | 0.9 | 14.2 | >MΩ |
| NdFeB | DyF$_3$ + DyF$_2$ + DyOF | 100 | 6000 | 0.8 | 13.2 | >MΩ |
| NdFeB | TbF$_3$ + TbF$_2$ + TbOF | 100 | 4000 | 1.0 | 18.8 | >MΩ |
| NdFeB | TbF$_3$ + TbF$_2$ + TbOF | 100 | 4000 | 1.0 | 20.8 | >MΩ |

Table 3 shows magnetic properties of magnetic powders prepared by surface treatment of fluorine compounds of elements other than Dy in the same manner mentioned above. The fluorine compounds shown in the Table 3 are main fluorine compounds produced by heat treatment, and phases produced around the interface between the magnetic powder and the fluorine compounds are shown. These phases are ones observed within about 100 nm from the interface; they are analyzed by composition and structure analyses with TEM, SEM, AES, etc, and XRD patterns.

When DyF$_3$ is formed on the surface of NdFeB powder in the manner mentioned above, the powder was heat treated at 400° C. for 30 minutes to one hour thereby to grow DyF$_2$, NdF$_2$ and NdO$_2$ around the interface. By further conducting heat treatment at such high temperatures as 500 to 800° C., Fe grows at an interface other than the above interface.

The Fe contains the rare earth elements and the oxygen content thereof is higher at the fluorine compound side than the surface of the magnetic powder. The Fe whose oxygen content is smaller than in the fluorine compounds grows when the heat treatment temperature is higher than 400° C. Like this, when the heat treatment temperature is high, rare earth elements and oxygen diffuse between the fluorine compounds and magnetic powder, and part of oxygen in the magnetic powder diffuses into the fluorine compounds. The diffusion causes the Fe phase (Fe—rare earth element alloys) on the surface of the magnetic powder to grow, a part of which exchanges with and bonds to NdFeB of the mother phase. The Fe phase contains rare earth elements and Co etc that are elements added to NdFeB, in some cases. Because the saturated magnetic flux density of the Fe phase is higher than that of NdFeB, the exchange bonding with NdFeB makes rotation magnetization of Fe with respect to exterior magnetic field difficult thereby to increase the residual magnetic flux density.

Figure 3:
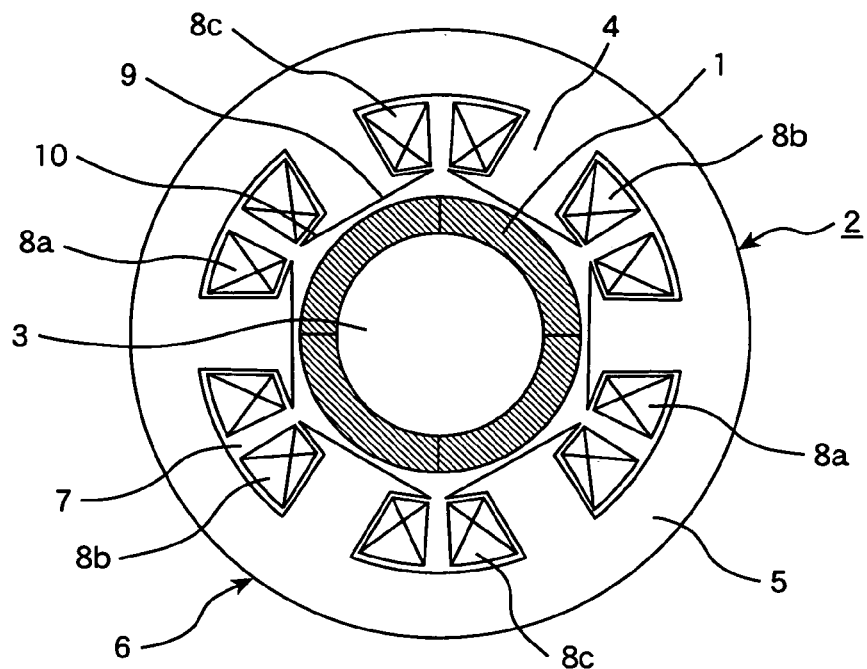
FIG. 3 shows a cross sectional view of a high resistance magnet motor according to embodiment 8.

As shown in FIG. 3, the residual magnetic flux density of the magnetic powder where Fe is recognized as the interface is larger than the case where Fe is not recognized at the interface of the magnetic powder having the grown fluorine compounds. When Fe grows as the interface phase, the maximum energy product BH$_{max}$ is large. Even when the heat treatment temperature is lower than 400° C., the Fe phase may be formed if the heat treatment is conducted for a long time period.

Embodiment 6

A solution for forming a coating of dysprosium-neodymium fluorine compound was prepared in the following manner.

(1) 2 grams of Dy nitrate and 2 grams of Nd acetate, which are salts well soluble in water, were added to about 100 mL of water, and the compound was completely dissolved by means of a shaker or ultrasonic stirrer.
(2) Hydrofluoric acid of about 10% was slowly added to the solution at such an equivalent rate that (Dy, Nd)F$_3$ is produced by a chemical reaction.
(3) The resulting solution containing gel state precipitate (Dy,Nd)F$_3$ was stirred by an ultrasonic solution stirrer for more than one hour.
(4) The solution was subjected to centrifugation at a rotation number of 4000 r.p.m.; then, after the supernatant was removed, almost the same amount of methanol was added.
(5) After the methanol solution containing gel state (Dy, Nd)F$_3$ was subjected to stirring to make it a suspension solution, it was stirred by the ultrasonic stirrer for more than one hour.
(6) The step (4) and step (5) were repeated 4 times until acetate ions or nitrate ions were not detected.
(7) The resulting sol state was obtained after treatment with methanol solution containing sol state (Dy, Nd)F$_3$ of 1 g/15 mL.

Then, as the rare earth element magnet, NdFeB alloy magnetic powder or SmCo alloy powder was used. NdFeB alloy powder is a Fe alloy containing at least one rare earth element or an alloy containing at least one rare earth element and at least one semi-metal element. SmCo alloy is a Co alloy containing at least one rare earth element. The Co alloy may contain various additive elements.

These magnetic powders have an oxygen content of 10 to 3000 ppm, an average particle size of 1 to 100 μm and magnetic anisotropy.

A process for forming metal fluorine compound coating of rare earth element fluorine compounds or alkaline earth metal fluorine compounds on rare earth magnetic powder was carried out in the following manner.

(1) 15 mL of the (Dy, Nd)F$_3$ coating film treatment liquid was added to 100 grams of the rare earth element magnetic powder having an average particle size of 10 µm, and the mixture was mixed until the whole of the rare earth magnetic powder was wetted.
(2) The resulting (Dy, Nd)F$_3$ coated rare earth magnetic powder was subjected to methanol removing treatment under a reduced pressure of 2-5 torr.
(3) The rare earth magnetic powder from which methanol solvent was removed at (2) was charged in a quartz boat; then, it was subjected to heat treatment under a reduced pressure of 1×10$^{-5}$ torr at 200° C. for 30 minutes and at 400° C. for 30 minutes.
(4) After the resulting magnetic powder at (3) was transferred to a porous alumina vessel, it was heated by a mili-wave at 400 to 800° C. under a reduced pressure of 1×10$^{-5}$ torr of argon atmosphere.
(5) Magnetic properties of the resulting magnetic powder at (4) were investigated.

NdFeB, magnetization rotation of Fe becomes difficult with respect to an external magnetic field by exchange bonding with NdFeB thereby to increase residual magnetic flux density.

As shown in Table 4, the residual magnetic flux density of the magnetic powder in which Fe is recognized as the interface becomes larger, compared with the case where Fe is not recognized as the interface though the fluorine compounds are formed. When Fe grows in the magnetic powder as the interface phase, the maximum energy product BH$_{max}$ is large. If the heat treatment temperature is lower than 400° C., the Fe phase grows if the heat treatment is carried out for a long time.

Embodiment 7

NdFeB alloy is powder whose average particle size is about 1 to 1000 µm and has a coercive force at room temperature is 16 kOe. The oxygen content of this NdFeB alloy (main phase is Nd$_2$Fe$_{14}$B) powder is 10 to 3000 ppm. Fluorine compound

TABLE 4

| Magnetic powder | Coating | Coating thickness (nm) | Oxygen content (ppm) | Residual magnetic flux density (T) | Coercive force (kOe) | Resistance (Ω) |
|---|---|---|---|---|---|---|
| NdFeB | (Dy, Nd)F$_3$ | 20 | 5000 | 1.2 | 17.5 | >MΩ |
| NdFeB | (Dy, Nd)F$_3$ | 20 | 4000 | 1.2 | 17.7 | >MΩ |
| NdFeB | (Dy, Nd)F$_3$ + (Dy, Nd)F$_2$ | 50 | 5000 | 1.1 | 19.5 | >MΩ |
| NdFeB | (Dy, Nd)F$_3$ + (Dy, Nd)F$_2$ + DyOF | 50 | 6000 | 0.8 | 13.9 | >MΩ |
| NdFeB | (Dy, Nd)F$_3$ + (Dy, Nd)F$_2$ + (Dy, Nd)OF | 100 | 6000 | 0.8 | 19.8 | >MΩ |
| NdFeB | (Tb, Nd)F$_3$ + (Tb, Nd)F$_2$ + (Tb, Nd)OF | 100 | 4000 | 1.1 | 21.2 | >MΩ |
| NdFeB | (Tb, Nd)F$_3$ + (Tb, Nd)F$_2$ + (Tb, Nd)OF | 100 | 4000 | 1.1 | 22.5 | >MΩ |

In Table 4 there are shown magnetic properties of magnetic powders on which fluorine compounds other than Dy were formed by the above-mentioned manner. As fluorine compounds main fluorine compounds formed by the heat treatment are shown. As the interface phase phases formed around the interface between the magnetic powder and the fluorine compounds are shown. These phases are observed in an area within about 1000 nm from the interface and are analyzed by composition analysis, structure analysis and XRD patterns with TEM, SEM, AES, etc.

When DyF$_3$ is formed on the surface of NdFeB alloy powder in the above mentioned manner, heat treatment at 400° C. for 30 minutes to one hour was conducted to form DyF$_2$, NdF$_2$ and NdO$_2$ in the neighborhood of the interface. When a heat treatment at 500 to 800° C. is conducted, Fe grew in an area other than the interface. This Fe contains rare earth elements; the oxygen content in the fluorine compound side is larger than on the surface of the magnetic powder.

When the other fluorine compounds are formed by surface treatment, Fe whose oxygen content is smaller than that in the fluorine compounds grows if the heat treatment temperature was 400° C. or higher. As the heat treatment temperature elevates, rare earth elements or oxygen diffuse between the fluorine compound and the magnetic powder. Part of oxygen of the magnetic powder diffuses into the fluorine compounds and part of the rare earth elements of the magnetic powder diffuses into fluorine compounds. The diffusion causes the Fe phase (Fe rare earth alloy) to grow; part of the Fe phase exchange bonds to NdFeB.

The Fe phase contains rare earth elements and some times contains Co, etc., which is added to NdFeB. Because the saturated magnetic flux density of the Fe phase is higher than to be mixed is NdF3. A starting material for NdFeB was ground in advance to make powder having an average particle size of 0.01 to 100 µm; NdFeB and NdF$_3$ were mixed and charged between twin rolls.

In order to make the shape of the fluorine compound powder lamellar, the surface temperature of the rolls was controlled to 300 to 600° C. so that the NdFeB powder and fluorine compound powder became deformed easily. The fluorine compound and NdFeB powder became flat by the rolls. A pressure load was 100 kg/cm$^2$ or more. The magnetic powder pressed by the twin rolls had lamellar fluorine compound on the surface thereof; if necessary, fluorine compounds were mixed with the rolled powder, followed by pressing with the rolls.

Fluorine compounds to be mixed are, in addition to NdF$_3$, LiF, MgF$_2$, CaF$_2$, ScF$_3$, VF$_2$, VF$_3$, CrF$_2$, CrF$_3$, MnF$_2$, MnF$_3$, FeF$_2$, FeF$_3$, CoF$_2$, CoF$_3$, NiF$_2$, ZnF$_2$, AlF$_3$, GaF$_3$, SrF$_2$, YF$_3$, ZrF$_3$, NbF$_5$, AgF, InF$_3$, SnF$_2$, SnF$_4$, BaF$_2$, LaF$_2$, LaF$_3$, CeF$_2$, CeF$_3$, PrF$_2$, PrF$_3$, NdF$_2$, NdF$_3$, SmF$_2$, SmF$_3$, EuF$_2$, EuF$_3$, GdF$_3$, TbF$_3$, TbF$_4$, DyF$_2$, DyF$_3$, HoF$_2$, HoF$_3$, ErF$_2$, ErF$_3$, TmF$^2$, TmF$_3$, YbF$_2$, YbF$_3$, LuF$_2$, LuF$_3$, PbF$_2$, and BiF$_3$.

If the oxygen content of the magnetic powder exceeds 3000 ppm, oxy-fluorine compounds that are formed by combining oxygen with the fluorine compounds are produced more than the fluorine compounds so that the oxy-fluorine compounds are formed in lamellar form on the surface of the NdFeB powder.

The magnetic powder heated and rolled by the twin rolls keeps residual local stress therein because of stress by pressure. The local stress may accelerate diffusion at the interface between the magnetic powder and the fluorine compounds. The interface between NdF$_3$ and the magnetic powder changes depending on the surface temperature of the rolls. $NdF_3/Nd_2Fe_{14}B$, $NdF_3$/Nd rich phase, $NdF_3/Nd_2O_3$, etc are formed at a temperature of 400° C. or lower. When the roll surface temperature is higher than 400° C., part of $NdF_3$ reacts with the magnetic powder to form $NdF_2$. At the same time, NdOF is formed.

Oxygen enters the NdF2; at a temperature higher than 400° C., oxygen and rare earth elements diffuse into the fluorine compounds. This diffusion causes the oxygen content in the magnetic powder to lower thereby to increase the residual magnetic flux density and coercive force, to improve rectangularity of magnetization curve or to reduce thermal demagnetization, etc.

Embodiment 8

Figure 4:
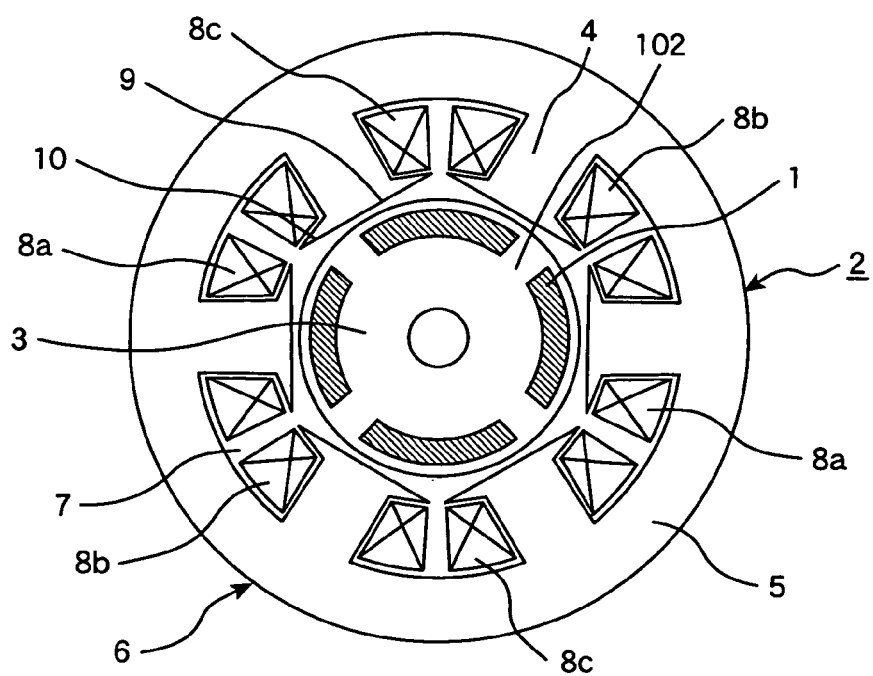
FIG. 4 shows a cross sectional view of a high resistance magnet motor according to embodiment 10.

FIG. 3 shows a cross sectional view in a diameter direction of a high resistance magnet motor according to the present invention. In the following, the same reference numerals in FIGS. 4, 7 and 8 as those in FIG. 4 represent the same members; unless necessary, explanations of the reference numerals in FIGS. 4, 7 and 8 may be omitted.

In FIG. 3, stator 2 of the high resistance magnet motor comprises stator iron core 6 having teeth 4 and core back 5, and stator winding 8 of concentric winding, which is wound so as to surround the teeth 4 in slots 7 (the winding for three phase winding consists of U phase winding 8a, V phase winding 8b and W phase winding 8c).

Because the high resistance magnet motor has 4 poles and 6 slots, a slot pitch in electrical angle is 120 degrees. The rotor is inserted into shaft bore 9 or rotor insertion bore 10 and permanent magnets 1 are arranged on the outer surface of the rotor shaft 3. As the stator, amorphous metal strip of FeSiB having a thickness of about 25 μm, under the trade name of METALGLAS2605TCA manufactured by Honeywell was used. The amorphous metal strip was punched out and resin was coated thereon. The strips were shaped by a press mold so as to improve space factor. The saturated magnetic flux density of the laminated amorphous strips was 1.25 T, when the space factor is 80%.

The amorphous metal used as the stator 2 exhibited higher efficiency than that of silicon steel (0.1 5 mm thick). The hysteresis loss and eddy current loss of the amorphous meta are smaller than those of the silicon steel; thus, the amorphous metal is suitable for motors for domestic appliances such as air conditioners, generators for decentralized power source and HEV driving motors, which require a high efficiency.

The resistance of the high resistance magnet is within a range of 0.2 to 10 mΩcm; the resistance of the magnet is locally increased by treating the NdFeB magnetic powder with a solution to form a layer containing fluorine compounds.

The fluorine compounds for surface treatment include LiF, $MgF_2$, $CaF_2$, $ScF_3$, $VF_2$, $VF_3$, $CrF_2$, $CrF_3$, $MnF_2$, $MnF_3$, $FeF_2$, $FeF_3$, $CoF_2$, $CoF_3$, $NiF_2$, $ZnF_2$, $AlF_3$, $GaF_3$, $SrF_2$, $YF_3$, $ZrF_3$, $NbF_5$, $AgF$, $InF_3$, $SnF_2$, $SnF_4$, $BaF_2$, $LaF_2$, $LaF_3$, $CeF_2$, $CeF_3$, $PrF_2$, $PrF_3$, $NdF_2$, $NdF_3$, $SmF_2$, $SmF_3$, $EuF_2$, $EuF_3$, $GdF_3$, $TbF_3$, $TbF_4$, $DyF_2$, $DyF_3$, $HoF_2$, $HoF_3$, $ErF_2$, $ErF_3$, $TmF_2$, $TmF_3$, $YbF_2$, $YbF_3$, $LuF_2$, $LuF_3$, $PbF_2$, $BiF_3$ and their oxyfluorine compounds or fluorine compounds whose fluorine atoms are deficit in part. The compounds are formed as a lamellar structure. If electric resistance of the fluorine compounds does not greatly change even when oxygen, carbon or nitrogen enters the fluorine compounds, such compounds can be used as the high resistance layer.

Further, the lamellar fluorine compounds may be constituted by plural fluorine compounds or may contain particle nitrogen compounds such as BN or TiN or carbides dispersed in the fluorine compounds. These compounds can be prepared by surface treatment or a dry method such as a sputtering method to control the oxygen content to 5000 ppm. In order to lower the oxygen content, powder or magnet with a reduced oxygen content in SmFeN powder, etc is used. It is necessary to control oxygen to be 3000 ppm or less.

In order to reduce an amount of oxygen admixing at the time of forming fluorine compounds, dehumidification and temperature control at the time of surface treatment and removal of impurities by heat treatment after the surface treatment are essential. Accordingly, the humidity was 60% or less, a temperature of a treatment room was 20° C. and the heat treatment was 350 to 1000° C.

Part of oxygen near the surface was removed by treating in an atmosphere containing hydrogen to control the amount 10000 ppm. If the amount of oxygen exceeds 10000 ppm in the magnet using fluorine compounds, there are such problems as an increase in thermal demagnetization, a reduction in anti-corrosion, a reduction in rectangularity of demagnetization, and an increase in collapse. Controlling the oxygen content to 10000 ppm or less can improve reliability of the high resistance magnet that uses the fluorine compounds. If a better anti-corrosion property is desired, Ni plating, Ni/Cu plating, Cr plating or resin coating is applied to the magnet using the fluorine compounds.

By employing the magnets using the fluorine compounds to rotating machines, heating of magnets can be suppressed and the eddy current of the magnets of high resistance after the surface treatment can be reduced.

Embodiment 9

FIG. 3 shows a laminate of silicon steel plates that is used as a stator iron core 6. Permanent magnets 1 are arranged in a circular form at the outer side of a rotor. Rotor shaft 3 is made of iron material of compacted molding. In the case where the high resistance magnet is anisotropic pole magnet, the shaft can be non-magnetic. In the high resistance magnet motor shown in FIG. 3, since it is possible to make the eddy current of permanent magnet 1 small, the loss can be reduced even if high magnetic field generates between the rotor and the stator, which is advantageous for high toque motors.

Since the saturated magnetic flux density of silicon steel or compacted iron is high compared with amorphous metal, gap magnetic flux density can be made high. The resistance of the high resistance magnet can be changed by forming conditions of a thickness of the high resistance layer containing fluorine compounds, kinds of under layers of the high resistance layer and molding conditions. When the thickness of the high resistance layer is made large, the residual magnetic flux density and energy product will become small; if high residual magnetic flux density is desired, an average thickness of the high resistance layer should be made small.

The high resistance layer containing fluorine compounds that contain at least one of rare earth elements or alkaline earth metals should have a thickness of 1 nm to 10 μm from the view point of magnetic properties.

Figure 9:
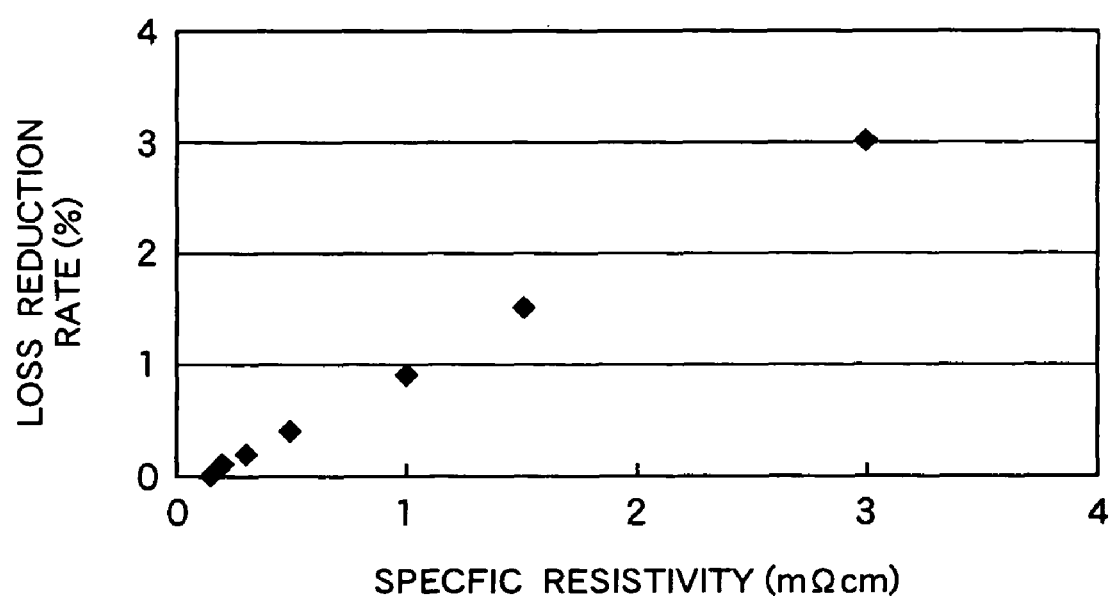
FIG. 9 shows relationship between reduction rate in loss of the high resistance magnet motors and specific resistivity according to embodiment 3.

In the case where the gap magnetic flux density is 1 T and a wave distortion of magnetic flux density is 0.5%, the relationship between specific resistance and loss reduction rate of the high resistance magnet is shown in FIG. 9. The high resistance magnet used in this case was one where a high resistance coating whose main components were $DyF_3$ and $DyF_2$ having a thickness of 100 nm was formed on NdFeB magnetic powder by the solution treatment. The residual magnetic flux density was 1.2 T and the coercive force was 25 kOe. The loss was reduced when the specific resistance was 0.2 mΩcm or more.

As the specific resistance increases, the loss reduction rate increases. It is presumed that the above mentioned advantages are caused by reduction in the eddy current of the magnet portion, minimization of influence of eddy current on the gap magnetic flux and temperature elevation suppression effect by reduction in eddy current.

Embodiment 10

In FIG. 4, stator core 2 for the high resistance magnet motor is composed of stator iron core 6 comprising teeth 4 and core back 5 and stator winding 8 of concentric winding, wound in slots 7 between the teeth so as to surround the teeth 4 (the winding consists of U phase winding 8a, V phase winding 8b and W phase winding 8c). Because the high resistance magnet motor is a type of 4 poles-6 slots, the slot pitch is 120 degrees in electrical angle.

The rotor is inserted into shaft bore 9 or rotor inserting bore 10 and permanent magnets 1 are disposed at the outside of the rotor shaft 3. In FIG. 4, silicon steel plate 102 was used for the stator and a laminate of punched silicon plates was used for the stator. Permanent magnets 1 were used for the rotor, the magnets being arranged in a circular form. The rotor shaft is made of iron material, and the permanent magnets 1 are radial anisotropic magnets.

Figure 5:
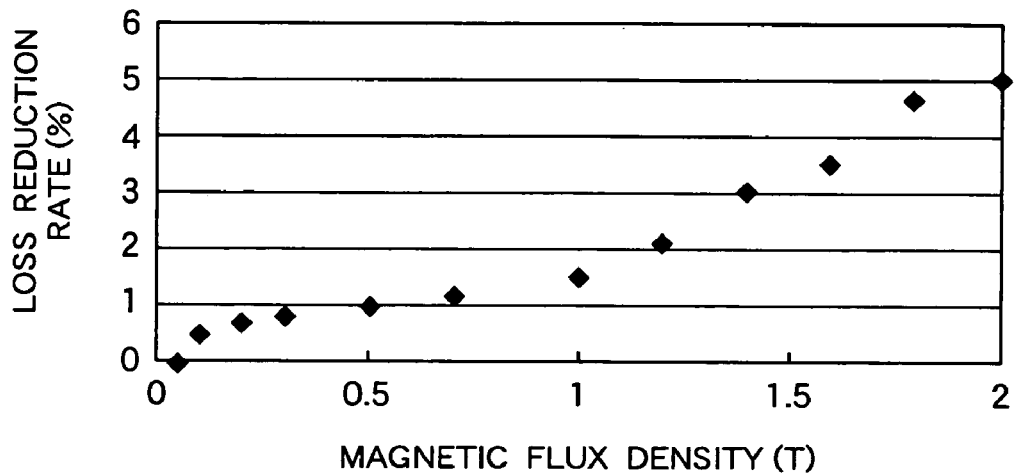
FIG. 5 shows relationship between reduction rate in loss of the high resistance magnet motors and magnetic flux density

In the high resistance motor shown in FIG. 4, the loss can be reduced, which is advantageous for high torque motors, even if high magnetic field generates in the gap between the rotor and stator because the eddy current of the permanent magnets can be made small. If the energy product of the permanent magnets 1 changes, the magnetic flux density in the gap changes. The loss of the high resistance magnet and loss of the conventional sintered magnet were compared. The results are shown in FIG. 5. The loss reduction effect is observed when the magnetic flux density is 0.1 T or more. The higher the magnetic flux density, the larger the loss reduction becomes larger. The specific resistance of the permanent magnets 1 was 1.5 mΩcm; if the resistance is higher, the loss reduction becomes larger.

Embodiment 11

Figure 7:
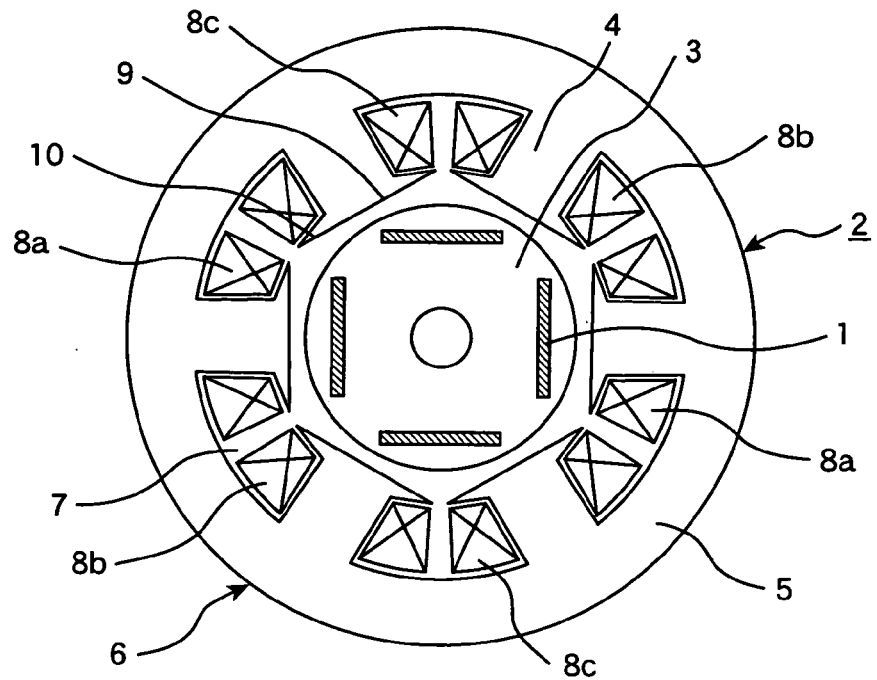
FIG. 7 shows a cross sectional view of a high resistance magnet motor according to one embodiment in embodiment 11.
Figure 8:
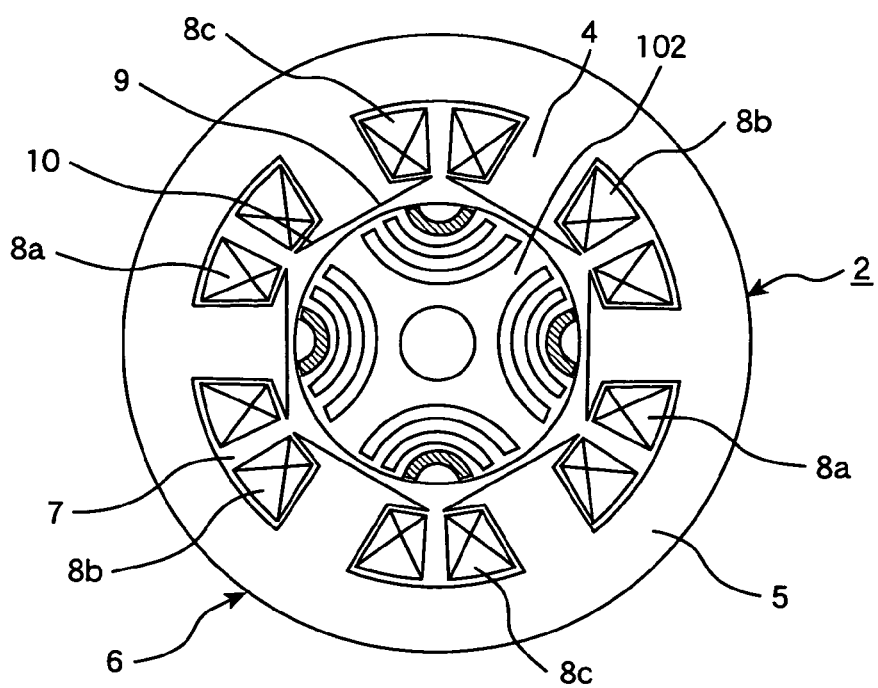
FIG. 8 shows a cross sectional view of a high resistance magnet motor according to another embodiment in embodiment 11.

In FIGS. 7 and 8, stator core 2 for the high resistance magnet motor is composed of stator iron core 6 comprising teeth 4 and core back 5 and stator winding 8 of concentric winding, wound in slots 7 between the teeth so as to surround the teeth 4 (the winding consists of U phase winding 8a, V phase winding 8b and W phase winding 8c). Because the high resistance magnet motor is a type of 4 poles-6 slots, the slot pitch is 120 degrees in electrical angle.

The rotor is inserted into shaft bore 9 or rotor inserting bore 10 and permanent magnets 1 are disposed at the specified position of the rotor shaft 3. In case of FIG. 7, the direction of anisotropy of the permanent magnets 1 is parallel with the short sides of the magnets. The permanent magnets are inserted into the bore of the shaft made of amorphous metal, the laminate of silicon steel plates or compacted iron powder.

In case of FIG. 8, the motor adopts a structure for utilizing reluctance torque. The cross sectional view of the permanent magnets 1 is not a simple one, but an arc structure. Although machined products of high resistance magnets can be utilized, a mixture of magnetic powder containing fluorine compounds as a starting material for high resistance magnet and resin is inserted into the laminate of the soft magnetic material 101, 102 or the compacted molding by an injection molding.

The high resistance magnets utilizing the fluorine compounds can be prepared by various methods listed below.

A first method includes formation of the high resistance layer containing the fluorine compounds on the surface of the sintered magnet block. All or part of the surface of the magnet blocks is covered with the high resistance layer. As a coating method, surface treatment, sputtering, evaporation, etc are adopted. In case of sputtering, it is possible to form a high resistance layer of nitrides such as BN or TiN or carbide, or mixtures of the high resistance material and fluorine compounds. When mili-waves with a frequency of GHz are irradiated onto the magnet blocks having the surface film, the fluorine compounds near the surface is selectively heated thereby to prevent peeling-off or to improve magnetic properties. Especially, when compounds containing elements, which make anisotropy large with respect to the mother phase, are formed, effects of increase in coercive force or rectangularity is observed.

Secondly, there is a method for forming compounds containing halogen elements such as fluorine, nitrogen compounds or carbon compounds on the surface of the powder by sputtering, etc. In this case, the solution treatment is useful for cost reduction of the process. A lamellar fluorine compound is formed along the surface of the magnetic powder thereby to increase resistivity of the magnetic powder.

When IV characteristics of the magnetic powder sandwiched between electrodes are measured, a high resistance layer that does not cause insulation breakdown at 100 Volts or less can be formed. If the magnetic powder is Fe group or Co group rare earth element magnet such as SmCo, NdFeB, a hardness of the high resistance layer whose mother phase is fluorine compounds is lower than that of the rare earth element magnet, the magnetic powder is easy to be deformed. Therefore, it is possible to make magnets using the fluorine compounds as a binder and bond magnets, wherein a mixture of resin and surface treated magnetic powder is molded by injection, extrusion, etc.

In general, there is a tendency that resistance of the mixture becomes small because of a contact between magnetic powder particles when an amount of binder volume is made small to improve magnetic properties. However, if the above mentioned surface treated magnetic powder is used, it is possible to use 1 to 10 vol. %, keeping the resistance of the magnet.

It is possible to improve magnetic properties or reliability of the surface treated magnetic powder when it is subjected to mili-wave irradiation. When irradiating the surface treated magnetic powder with the mili-wave to cause the fluorine compounds to generate heat so as to accelerate diffusion of the rare earth elements, it is possible to achieve increase in coercive force and rectangularity, removal of impurities and improvement of close contact between the fluorine compounds and magnetic powder, reduction in thermal demagnetization, etc.

Thirdly, there is a method wherein fluorine compounds are formed on Fe group or Co group powder other than magnetic powder, followed by mili-wave heating to heat only around the fluorine compounds. As the particle size increases, the fluorine compounds generate heat, suppressing thermal affects on the inside of the particle. As a result, the improvement of magnetic properties only around the surface of the powder and bonding among the plural particles are achieved.

Figure 6:
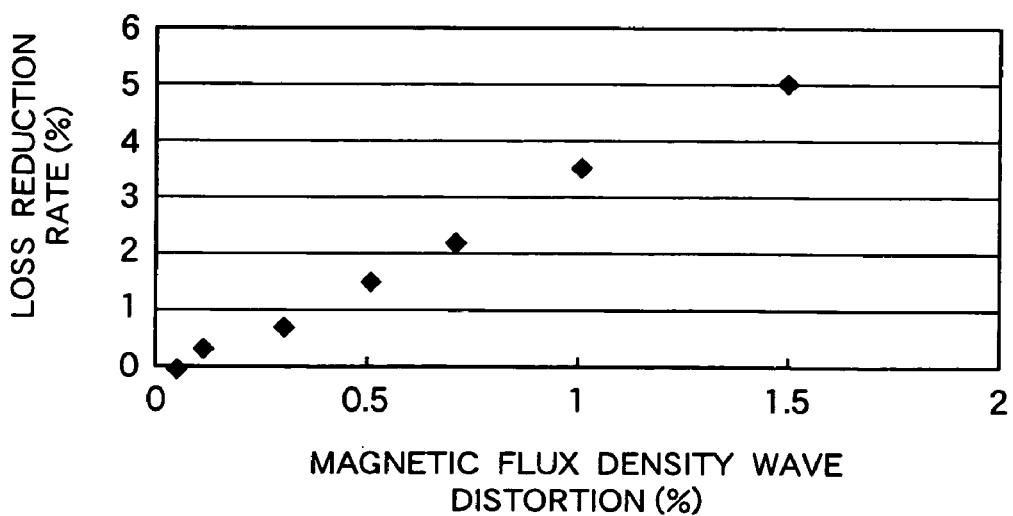
FIG. 6 shows relationship between reduction rate in loss of the high resistance magnet motors and wave distortion of magnetic flux density according to embodiment 10.

Relationship between magnetic flux density distortion of the high resistance magnet rotor prepared according to the above mentioned methods and loss reduction rate of a rotor using the high resistance magnet is shown in FIG. 6. A magnetic flux density of the gap was 1 T, and a specific resistivity of the magnet was 1.5 mΩcm. Loss reduction was recognized when the magnetic flux density distortion was 0.1% or more. The larger the wave distortion, the larger the loss reduction becomes large. When the wave distortion is large, the magnetic flux density wave contains harmonics and eddy current loss tends to occur if the resistance is low. Accordingly, it is possible to reduce the eddy current loss and a loss due to eddy current by making resistance of the magnet high. That is, when the wave form of frequency of the magnetic flux density in the gap becomes high and when the magnetic flux density is high, the effects of reduction in eddy current loss are remarkable and can prevent heat generation of the magnet.

Since the present invention makes it possible to reduce a loss at high frequency by forming a lamellar high resistance layer on a hard magnetic material and soft magnetic material 101, 102, the invention is applied to magnetic circuits to which high frequency magnetic field is applied. As for magnets of hard magnetic materials such as R—Fe—B (R: rare earth elements) group magnets, energy product is suppressed and heat generation in the magnet is suppressed when harmonic magnetic field is applied.

Thus, the present invention is applied to rotating machines such as buried type magnet motors, surface magnet motors, generators, etc. These motors are used for driving, starter or power steering motors for hybrid automobiles, industrial motors, spindle motors for HDD, servomotors, domestic appliances, robots, railway motors, etc.

Embodiment 12

If NdFeB sintered magnet block is machined with a mechanical polisher, there may be formed a machining transformed layer on the surface thereof to degrade magnetic properties. The machined NdFeB sintered magnet block of 10×10×10 mm had fine cracks formed by machining and polishing in the surface thereof, part of the cracked surface being oxidized. Since the oxides contain rare earth elements or iron, which are the constituting components of the sintered magnet, magnetization may tend to reverse thereby to decrease the residual magnetic flux density or coercive force. The deterioration of these magnetic characteristics may be problems in cases where the magnets are used at high temperatures or under high demagnetization field, which leads to weaken the demagnetization resistance of the magnet.

As an effective measure to recover the magnetic characteristics, there is a method of coating the magnet with rare earth element containing solution. The rare earth element containing solution is prepared by dissolving acetate Dy or nitrate Dy in water, stirring it and centrifuging the solution, followed by adding methanol to the solution. The sintered magnet, which is coated with the solution and is subjected to heat-treatment, has the following advantages, compared with the method wherein powdered fluorine compounds are coated on the magnet.

(1) A surface with fine cracks is easily covered with the solution.
(2) It is possible to store the solution in pits or recesses, as well as covering the crack surface.
(3) A heat treatment temperature can be shortened and lowered because the solution makes surface contact with the magnet surface.
(4) Impurities such as carbon in the solution tend to diffuse into the magnet together with the rare earth elements and fluorine atoms.
(5) A thickness of the coating film is easily controlled because of the solution and it is possible to make the film thinner.
(6) It is possible to mix various atoms in the solution.
(7) It is possible to coat it with a constant thickness using a spinner or the like and the solution can be reused.
(8) Coagulation of powder, which is peculiar problem in powder, is prevented and a coating with a constant thickness is obtained.
(9) A multi-step processing is realized wherein different fluorine compound solutions are used in different steps, by combining the solutions with heat treatment temperatures. (For example, after treating the magnet with the Nd solution and subjecting it to heat treatment, the magnet is treated with another fluorine compound of the rare earth element solution and is subjected to heat treatment.

Acetate Dy was used to make a transparent DyF solution. An average thickness of the coating of the solution was 10 nm, which extended from the surface to the inside of the cracks of the sintered magnet. Even if there are holes inside the cracks, the fines holes can be filled with the solution. Since the solution is in face contact with the surface of the magnet, the diffusion of rare earth elements or impurities tend to occur at low temperatures. Since the distribution of film thickness is more constant compared with that of power coating, reduction of an amount used for diffusion of the rare earth elements is easy.

When light elements other than the rare earth elements are present in the solution, the light elements may diffuse together with Dy as the rare earth elements and fluorine atoms, which tend to remain in the grain boundaries. As the light element, carbon is an example. Carbon atoms contained in the solution diffuse into the inside of the sintered block magnet through the surface or grain boundaries of the sintered NdFeB group block magnet. Accordingly, carbon atoms present in the grain boundaries or the surface of the sintered block magnet are detected by EDX, etc.

After the DyF group solution is coated at an average thickness of 100 nm on the flat portion, Dy, F (fluorine), C (carbon) diffuse along the interface of the grain boundaries at the time of removing the solvent. Rare earth elements fluorine compounds containing carbon, Dy fluorine compounds or Dy oxides grow on the outermost surface of the magnet block; as the heat treatment temperature elevate, Dy and light elements diffuse into the inside of the magnet block.

Mutual diffusion of Dy and Nd takes place at 500° C. or higher so that a layer rich in Dy near the grain boundaries. Part of Nd atoms reacts with fluorine, carbon or oxygen so that the products are fixed at the grain boundaries, wherein Dy distributes within a range of 1200 nm from the grain boundaries. The mutual diffusion of Nd and Dy at the grain boundaries tends to occur in the presence of carbon and Dy remains near the grain boundaries. From this fact, it is possible to increase the residual magnetic flux density at the same coercive force as well as to increase coercive force and Hk in the case where the solution is used rather than the use of fluorine compound powder, because of a rare earth element fixing effect by the light elements in the solution. Phases where Dy, carbon atoms and fluorine atoms segregated at the triple points of grain boundaries are observed.

Confirmed features of the solution method include the fixing effect of the rare earth elements (Dy) at the grain boundaries by the light element in the solution. When the DyF group solution and methanol or ethanol as a solvent are used, fluorine compounds or oxy-fluorine compounds grow at the grain boundaries whose carbon content is high in the surface to the inside of the sintered magnet block. The diffusion between the compounds containing carbon and the rare earth elements constituting the magnet takes place thereby to cause Dy to diffuse near the grain boundaries, wherein Nd and Dy compounds contain carbon in a relatively large amount.

If the present method is employed, carbon atoms diffuse into the grain boundaries to assist diffusion of Dy into the grain boundaries and to accelerate the mutual diffusion between Dy and Nd. This method is better than a method wherein the fluorine compound powder is coated on the surface of the sintered magnet block and the coating is heat-treated to diffuse Dy into near the grain boundaries. Further, in case of the solution treatment, since the solution may enter the fine cracks of the sintered magnet block better than in the powder treatment. The diffusion time may be short, an amount of rare earth elements can be made small, and a diffusion length can be extended in the solution method.

The rare earth element compounds or rare earth oxy-fluorine compounds that contain carbon in an amount detectable by EDX are formed in the grain boundaries or near the grain boundaries, but carbon detectable by EDX is not present in the inner portion where the rare earth element fluorine compounds or the rare earth oxy-fluorine compounds grow as grains or layers. Dy segregates in these rare earth element fluorine compounds or rare earth element oxy-fluorine compounds. The growth of the rare earth element fluorine compounds or rare earth element oxy-fluorine compounds, both of which contain carbon, and diffusion of Dy into the region near the grain boundaries bring about the following advantages. That is, an increase in a coercive force and rectangularity, reduction in temperature dependency of magnetic characteristics, reduction in an amount of the rare earth elements and lowering of thermal demagnetization are expected.

Embodiment 13

A fluorine compound solution was prepared in the following manner. At first, acetic Dy or nitric Dy was dissolved in water; then hydro-fluoric acid was added to the solution to produce a gel state precipitate solution. Thereafter, the solution was subjected to centrifugation and methanol was added, followed by stirring.

An NdFeB group sintered magnet block (10×10×10 mm) was dipped in the methanol solution and dried and heat treated to diffuse Dy along the grain boundaries in the NdFeB group sintered magnet block. The heat treatment temperature was 500° C. or higher, preferably 800° C. or higher. According to the heat treatment, hydrogen, carbon, oxygen or nitrogen contained in the solution diffuses together with fluorine into the sintered magnet block to form Nd fluorine compounds containing a lot of Dy on the surface of the sintered magnet block.

Dy, fluorine or light element atoms diffuse from the fluorine compounds into the magnet. Since the solution is used, the solution enters cracks having 1 nm width thereby to form the fluorine compounds at low temperatures, the fluorine compounds easily grow at portions of magnetic characteristics deteriorated by machining so that the magnetic characteristics are recovered by a small amount of rare earth elements.

$(Dy,Nd)_x(O,F,C)_y$ grows at part of the grain boundaries in the magnet (x and y are integers). Dy segregates near the fluorine compounds or oxy-fluorine compounds containing light elements such as carbon thereby to occur exchange Nd and Dy by diffusion. Carbon atoms contribute to segregation of Dy, stability of fluorine compounds and oxy-fluorine compounds and exchange between Nd and Dy. It was confirmed that when the 0.5 vol. % of the solution was coated on the magnet, followed by drying and heat-treatment, the coercive force was increased by 50%. In addition to the increase in the coercive force, increase in rectangularity of demagnetization curve, improvement of temperature dependency of characteristics and increase in mechanical strength were confirmed.

Since the treating solution contains ionic components such as acetic group, it is possible to form the oxy-fluorine compounds, while removing oxides on the surface of the sintered magnet. The process also eliminates the acid cleaning before the treatment. Further, if a treatment solution having a low viscosity, it is possible to supply the solution to gaps of 1 to 10 nm. Compared with the method using powder, it is possible to shorten the treating time and lowering of treatment temperature because fluorine compounds or oxy-fluorine compound or the fluorine compounds containing carbon Dy diffuses grow at the grain boundaries.

Embodiment 14

A solution of a fluorine compound was prepared in the following manner.

Dy acetate or nitric Dy was dissolved in water to which hydro-fluoric acid was containing iron ions was added gradually thereby to form a gel precipitate solution. Thereafter, the solution was subjected to centrifugation and then methanol was added under stirring. The solution was subjected to centrifugation and ethanol was added under stirring.

A NdFeB group sintered magnet block (10×10×10 mm³) was immersed in the ethanol solution. After immersion, the block was dried and heat-treated so that Dy was diffused along the grain boundaries of the NdFeB group magnet. The heat treatment temperature was 50° C. or higher, preferably 800° C. or higher.

According to the heat treatment, hydrogen, carbon, oxygen or nitrogen contained in the solution diffuses together with fluorine into the sintered magnet block to form Nd fluorine compounds containing a lot of Dy on the surface of the sintered magnet block.

Dy, fluorine or light element atoms diffuse from the fluorine compounds into the magnet. Since the solution is used, the solution enters cracks having 1 nm width thereby to form the fluorine compounds at low temperatures, the fluorine compounds easily grow at portions of magnetic characteristics deteriorated by machining so that the magnetic characteristics are recovered by a small amount of rare earth elements.

$(Dy,Nd)_x(O,F,C)_y$ grows at part of the grain boundaries in the magnet (x and y are integers). Dy segregates near the fluorine compounds or oxy-fluorine compounds containing light elements such as carbon and iron thereby to occur exchange Nd and Dy by diffusion. Carbon atoms contribute to segregation of Dy, stability of fluorine compounds and oxy-fluorine compounds and exchange of Nd and Dy. It was confirmed that When the 0.5 vol. % of the solution was coated on the magnet, followed by drying and heat-treatment, the coercive force was increased by 50%. In addition to the increase in the coercive force, increase in rectangularity of demagnetization curve, improvement of temperature dependency of characteristics and increase in mechanical strength were confirmed.

Since the treating solution contains ionic components, it is possible to form the oxy-fluorine compounds, while removing oxides on the surface of the sintered magnet. The process also eliminates the acid cleaning before the treatment. Further, if a treatment solution having a low viscosity, it is possible to supply the solution to gaps of 1 to 10 nm. Compared with the method using powder, it is possible to shorten the treating time and lowering of treatment temperature because fluorine compounds or oxy-fluorine compound or the fluorine compounds containing carbon Dy diffuses grow at the grain boundaries.

Embodiment 15

A solution of a fluorine compound was prepared in the following manner.

Dy acetate or nitric Dy was dissolved in water to which hydro-fluoric acid was containing iron ions was added gradually thereby to form a gel precipitate solution. Thereafter, the solution was subjected to centrifugation and then methanol was added under stirring. The solution was subjected to centrifugation and ethanol was added under stirring.

1 to 1000 of NdFeB group sintered magnet blocks (10×10× 10 $mm^3$) were immersed simultaneously in the ethanol solution. After immersion, the block was dried and heat-treated so that Dy was diffused along the grain boundaries of the NdFeB group magnet. The heat treatment temperature was 50° C. or higher, preferably 800° C. or higher.

According to the heat treatment, hydrogen, carbon, oxygen, nitrogen or iron contained in the solution diffuses together with fluorine into the sintered magnet block to form Nd fluorine compounds containing light elements, iron, Dy and Fe on the surface of the sintered magnet block.

Dy, fluorine or light element atoms diffuse from the fluorine compounds into the magnet. Since the solution is used, the solution enters cracks having 1 nm width thereby to form the fluorine compounds at low temperatures, the fluorine compounds easily grow at portions of magnetic characteristics deteriorated by machining so that the magnetic characteristics are recovered by a small amount of rare earth elements.

$(Dy,Nd)_x(O,F,C)_y$ grows at part of the grain boundaries in the magnet (x and y are integers). Dy segregates near the fluorine compounds or oxy-fluorine compounds containing light elements such as carbon thereby to occur exchange Nd and Dy by diffusion. Carbon atoms or iron atoms contribute to segregation of Dy, stability of fluorine compounds and oxy-fluorine compounds and exchange of Nd and Dy. It was confirmed that When the 0.01 to 1 vol. % of the solution was coated on the magnet, followed by drying and heat-treatment, the coercive force was increased by 50%. In addition to the increase in the coercive force, increase in rectangularity of demagnetization curve, improvement of temperature dependency of characteristics, increase in mechanical strength and increase in local electric resistance were confirmed.

The treating solution may contain other rare earth element than Dy or alkaline earth metals; it is possible to add rare earth element powder of rare earth fluorine compounds or rare earth oxy-fluorine compounds having a particle size of 0.01 to 1 micrometer in an amount of 1 to 50 wt %. The above mentioned heat treatment or heat treatment at 800° C. or higher and heat treatment at 800° C. or lower can improve the magnetic characteristics.

Embodiment 16

A fluorine compound solution was prepared in the following manner. At first, acetic Dy or nitric Dy was dissolved in water; then hydro-fluoric acid was added to the solution to produce a gel state precipitate solution. Thereafter, the solution was subjected to centrifugation and methanol was added, followed by stirring.

An NdFeB group sintered magnet block (10×10×10 mm) was immersed in the methanol solution and dried and heat treated at 200° C. to grow the fluorine compounds or oxy-fluorine compounds containing Dy on the surface of the NdFeB group sintered magnet. Then, the magnet was subjected to heat treatment temperature at 500° C. or higher, preferably 800° C. According to the heat treatment, hydrogen, carbon, oxygen or nitrogen contained in the solution diffuses together with fluorine into the sintered magnet block to form Nd fluorine compounds containing a lot of light elements and Dy on the surface of the sintered magnet block.

Dy, fluorine or light element atoms diffuse from the fluorine compounds into the magnet though the surface thereof. Since the solution is used, the solution enters cracks having 1 nm width thereby to form the fluorine compounds at low temperatures, the fluorine compounds easily grow at portions of magnetic characteristics deteriorated by machining so that the magnetic characteristics are recovered by a small amount of rare earth elements.

$(Dy,Nd)_x(O,F,C)_y$ grows at part of the grain boundaries in the magnet (x and y are integers). Dy segregates near the fluorine compounds or oxy-fluorine compounds containing light elements such as carbon thereby to occur exchange between Nd and Dy by diffusion. Carbon atoms contribute to segregation of Dy, stability of fluorine compounds and oxy-fluorine compounds and exchange of Nd and Dy. It was confirmed that when the 0.5 vol. % of the solution was coated on the magnet, followed by drying and heat-treatment, the coercive force was increased by 50%. In addition to the increase in the coercive force, increase in rectangularity of demagnetization curve, improvement of temperature dependency of characteristics and increase in mechanical strength were confirmed.

Since the treating solution contains ionic components such as acetic group, it is possible to form the oxy-fluorine compounds, while removing oxides on the surface of the sintered magnet. The process also eliminates the acid cleaning before the treatment. Further, if a treatment solution having a low viscosity, it is possible to supply the solution to gaps of 1 to 10 nm. Compared with the method using powder, it is possible to shorten the treating time and lowering of treatment temperature because fluorine compounds or oxy-fluorine compound or the fluorine compounds containing carbon Dy diffuses grow at the grain boundaries.

It was also confirmed that when fluorine compound of Nd and Tb are used, a coercive force was increased. A solution of fluorine compound of an alkaline earth metal could improve rectangularity. Accordingly, in order to improve magnetic characteristics, fluorine compounds, oxy-fluorine compounds or carbon-containing oxy-fluorine compounds such as $(Nd,M)_xF_y$, $(Nd,M)_x(F,O)_y$ or $(Nd,M)_x(F,O,C)_y$, etc (x, y are integers) may recover the characteristics by reducing the with fluorine atoms. The deterioration of the characteristics is mainly caused by oxidation of the rare earth elements on the surface of the fluorine compounds.

Embodiment 17

A fluorine compound solution was prepared in the following manner. At first, acetic Mg or nitric Mg was dissolved in water; then hydro-fluoric acid was added to the solution to produce a gel state precipitate solution. Thereafter, the solution was subjected to centrifugation and methanol was added, followed by stirring.

An NdFeB group sintered magnet block (10×10×10 $mm^3$) was immersed in the methanol solution and dried and heat treated at 200° C. to grow the fluorine compounds or oxy-fluorine compounds containing Mg on the surface of the NdFeB group sintered magnet. Then, the magnet was subjected to heat treatment temperature at 500° C. or higher, preferably 800° C. According to the heat treatment, hydrogen, carbon, oxygen or nitrogen contained in the solution diffuses together with fluorine into the sintered magnet block to form Mg fluorine compounds containing a lot of light elements and Mg on the surface of the sintered magnet block.

Mg, fluorine or light element atoms diffuse from the fluorine compounds into the magnet though the surface thereof. Since the solution is used, the solution enters cracks having 1 nm width thereby to form the fluorine compounds at low temperatures, the fluorine compounds easily grow at portions of magnetic characteristics deteriorated by machining so that the magnetic characteristics are recovered by a small amount of rare earth elements.

$(Mg,Nd)_x(O,F,C)_y$ grows at part of the grain boundaries in the magnet (x and y are integers). Mg segregates near the fluorine compounds or oxy-fluorine compounds containing light elements such as carbon thereby to occur exchange between Nd and Mg by diffusion. Carbon atoms contribute to segregation of Mg, stability of fluorine compounds and oxy-fluorine compounds and exchange between Nd and Mg. It was confirmed that when the 0.5 vol. % of the solution was coated on the magnet, followed by drying and heat-treatment, the coercive force was increased by 10%. Improvement of temperature dependency of characteristics and increase in mechanical strength were confirmed.

Since the treating solution contains ionic components, it is possible to form the oxy-fluorine compounds, while removing oxides on the surface of the sintered magnet. The process also eliminates the acid cleaning before the treatment. Further, if (Nd,Dy)FeB group magnet is used, Nd and Dy enter into the fluorine compounds or oxy-fluorine compounds that grow along the grain boundaries by reaction between Mg fluorine compounds and rare earth element compounds. A heat treatment causes Dy and Nd from the fluorine compounds or the oxy-fluorine compounds to diffuse along the grain boundaries of the sintered magnet so that magnetic characteristics such as increase in coercive force and rectangularity were confirmed. That is, after the sintered magnet is covered with treating liquid that does not contain rare earth elements, heat treatment at a temperature of 500° C. but lower than a sintering temperature is applied to the coated magnet thereby to diffuse rare earth elements along the grain boundaries. The mutual diffusion between Dy and Nd makes Dy diffuse near the grain boundaries. By this method, magnetic characteristics of the sintered magnet can be improved by using the fluorine compounds that contain no rare earth elements. For example, rectangularity of the magnet was increased by 10%.

When the magnet is treated with a Mg fluorine compound solution to which a heavy rare earth elements such as Dy is added or treated with multi-layers, rectangularity and coercive force can be improved.

Embodiment 18

In using the NdFeB group sintered magnet for high heat resistance purpose, heavy rare earth elements such as Dy, Ho, Tb, etc, semi-metals such as Ga or transition metals such as Nb are added to the magnet. There are a mother phase $RE_2Fe_{14}B$ (RR is a rare earth element) and grain boundary phase and boride phase in the sintered magnet. There occur cracks in the surface of the magnet during machining and polishing steps, the cracks being oxidized. The oxidation deteriorates the magnetic characteristics. Further, since the crack portion is non-magnetic and is an interface with uneven face, reverse magnetic segments tend to occur thereby to lower rectangularity.

When the fluorine compounds come into contact with the cracks or the surface of the magnet with a width of 1 to 1000 nm, part of fluorine atoms reacts with oxygen or rare earth elements at the interface. When thermal energy is applied the interface, the reaction products diffuse through the interface thereby to cause the rare earth fluorine compounds or rare earth element fluorine to grow so that the oxides of rare earth elements are reduced to rare earth fluorine compounds or oxy-fluorine compounds.

Since the solution was used, this reaction takes place in all of the faces where the solution is in contact with the magnet thereby to grow oxy-fluorine compounds. Growth of rare earth element fluorine compounds near the surface of the sintered magnet is recognized. At the same time, atoms such as fluorine, rare earth elements and carbon in the solution diffuse along the grain boundaries to enter the inside. If the width of cracks is 1000 nm or less and a thickness of oxide is 100 nm or less, a surface treatment with a treating liquid of Mg fluorine compounds that do not contain rare earth elements improves rectangularity of the sintered magnet. That is, the rare earth oxides perform improvement of magnetic characteristics by reduction reaction with the rare earth element oxides.

In the case where the heavy rare earth elements are used for the sintered magnet in advance, a layer of the oxy-fluorine compounds of the heavy rare earth elements are grown by heat treatment using a Mg fluorine compound treatment solution that does not contain rare earth elements. The heavy rare earth elements are grown along the grain boundaries and the heavy rare earth elements are segregated near the grain boundaries by exchange between the heavy rare earth elements and Nd. Fluorine or light metals such as carbon in the solution that form a compound with the rare earth elements are detected near the grain boundaries.

It has been known that the rare earth elements form compounds with boron, nitrogen and oxygen; it is possible to perform the exchange reaction between the heavy rare earth elements and rare earth elements by utilizing the difference between free formation energy.

In order to improve magnetic characteristics of the sintered magnet as a whole, fluorine and the rare earth elements are diffused along the grain boundaries to segregate fluorine and the rare earth elements along the grain boundaries. The diffusion of the rare earth elements at the grain boundaries is assisted by the light elements that form compounds with fluorine and the rare earth elements. In case where the rare earth elements are diffused from the solution, the diffusion proceeds at low temperature because the contact between the solution and the sintered magnet is in a face contact. At the same time, the light elements in the solution diffuse along the grain boundaries thereby to assist the diffusion of the rare earth elements. As a result, it is possible to make small a crystal size of the fluorine compounds containing the rare earth elements, fluorine earth metal compounds or the rare earth element carbon acid fluorine compounds, which grow at grain boundaries.

After a fluorine solution of Dy in a concentration of 0.1 to 5 vol. % was coated, the magnet was heat-treated at 500 to 1000° C. The fluorine rare earth element compounds and carbon acid fluorine compounds grow in the surface of the sintered magnet having a particle size of 0.1 to 10 nm, which is smaller than that of compounds grown in the outermost surface of the magnet. A smaller particle size of the rare earth fluorine compounds or the rare earth carbon acid fluorine compounds is preferable. If the compounds grow along the grain boundaries, a size in parallel with the grain boundaries is longer than that perpendicular to the grain boundaries when the size is evaluated in the parallel direction with the grain boundaries and the direction perpendicular to the grain boundaries. The above fact contributes to an increase in coercive force.

A content of fluorine in the rare earth element compounds or the rare earth element carbon acid fluorine compounds is 0.1 to 50 atomic %, a carbon content is 0.1 to 10 atomic % and an oxygen content is 0.01 to 10 atomic %. Fluorine atoms and carbon atoms segregate along the grain boundaries; diffusion among the rare earth element atoms along the grain boundaries as the center and further diffuse around the grain boundaries thereby to improve magnetic characteristics. An increase in coercive force is 10 to 200% and as increase in rectangularity is 5 to 20% so that improvement of demagnetization resistance was acknowledged.

A rate of the area of grain boundaries where fluorine content is 0.1% or more per the whole area of the grain boundaries is 10% or more, preferably 50% or more.

A large amount of light elements such as carbon that diffuses from the solution are recognized at grain boundaries on the surface of the sintered magnet, and there is a tendency that the content thereof decreases in the inside of the grains. The light elements that form compounds with the rare earth elements are present at grain boundaries to accelerate the diffusion of the rare earth elements to thereby lowering of heat-treatment temperature, shortening of heat-treatment, and acceleration of growth of a phase containing fluorine and to improve magnetic characteristics.

Carbon in an amount 1/10 to 2 times an amount of oxygen is present in the oxy-fluorine compounds in the surface of the sintered magnet block. The carbon diffuses during heat-treatment after the solution treatment, and diffuses along the grain boundaries in the magnet. A solution containing the rare earth elements and fluorine is coated on the sintered magnet, followed by heat-treatment at 1000° C. or lower so that increase in coercive force and rectangularity of the demagnetization curve have been confirmed.

Features of utilization of solutions are as follows:
(1) Because of solutions, small crack surfaces having 1 to 100 nm are coated easily.
(2) Because of solutions, solutions are stored in recesses and holes as well as coating the crack surface with the solutions. NdFeB grains that are to be peeled off by machining are bonded.
(3) Because of solutions, the surface of the magnet and fluorine or rare earth elements are in face contact thereby to lower heat-treatment temperature or to shorted the heat-treatment time.
(4) Impurities such as carbon in the solution enter the magnet together with the rare earth elements and fluorine at the time of heat-treatment so that a layer containing fluorine grows at the grain boundaries.
(5) Because of solutions, control of thickness of coating is easy and thinning of the coating thickness is easy so that a coating of 1 to 1000 nm is easily formed.
(6) It is possible to add various elements in the solutions. The followings may be possible: adding of light elements (hydrogen, oxygen, nitrogen, etc), mixing of the solutions with various acid solutions, mixing with fine powder of rare earth element powder, and mixing with rare earth element compounds.
(7) A homogeneous coating using a spinner is possible and the solution can be used repeatedly.
(8) A homogeneous coating is possible because there is no problem such as coagulation in peculiar phenomenon in powder technologies.
(9) It is possible to realize a multi-step process using different fluorine compound solutions by combining heat-treatment wherein after the magnet is subjected to an Nd fluorine solution and heat-treatment, the magnet is subjected to treatment with other heavy rare earth element solutions and heat-treatment.

These features have been confirmed in treating the surface of NdFeB group magnetic powder to improve magnetic characteristics, as well as treating the sintered magnet block.

Embodiment 19

In using the NdFeB group sintered magnet for high heat resistance purpose, heavy rare earth elements such as Dy, Ho, Tb, etc, semi-metals such as Ga or transition metals such as Nb are added to the magnet. There are a mother phase $RE_2Fe_{14}B$ (RR is a rare earth element) and grain boundary phase with a high content of the rare earth elements and boride phase in the sintered magnet. There occur cracks in the surface of the magnet during machining and polishing steps, the rare earth elements being oxidized. The oxidation deteriorates the magnetic characteristics. Further, since the crack portion is space, which is non-magnetic and is an interface with uneven face, reverse magnetic segments tend to occur thereby to lower rectangularity of the de-magnetization curve.

When the fluorine compounds come into contact with the cracks or the surface of the magnet with a width of 1 to 1000 nm, part of fluorine atoms constituting the sintered magnet reacts with oxygen or rare earth elements at the interface. When thermal energy is applied thereto, the reaction products diffuse through the interface thereby to cause the rare earth fluorine compounds or rare earth element fluorine to grow so that the oxides of rare earth elements are reduced to rare earth fluorine compounds or oxy-fluorine compounds.

At the same time, there happens the exchange reaction between the rare earth elements in the solution and the rare earth elements constituting the sintered magnet. Since the solution was used, this reaction takes place in all of the faces where the solution is in contact with the magnet thereby to grow oxy-fluorine compounds. Growth of rare earth element fluorine compounds near the surface of the sintered magnet is recognized.

In the case of a solution containing Dy and fluorine, Dy in the solution and Nd in the sintered magnet mutually diffuse to form $(Dy,Nd)_x(F,O,C)_y$, etc (x, y are integers). At almost the same time, fluorine, rare earth elements or carbon in the solution diffuse in the inside of the magnet.

If the width of cracks is 1000 nm or less and a thickness of oxide is 100 nm or less, a surface treatment with a treating liquid of Mg, Ca or Fe fluorine compounds that do not contain rare earth elements improves rectangularity of the sintered magnet. That is, the rare earth oxides perform improvement of magnetic characteristics by reduction reaction with the rare earth element oxides.

In the case where the heavy rare earth elements such as Dy, Tb, Ho, etc are used for the sintered magnet in advance, a layer of the oxy-fluorine compounds of the heavy rare earth elements are grown by heat treatment using a Mg fluorine compound treatment solution that does not contain rare earth elements. The heavy rare earth elements are grown along the grain boundaries and the heavy rare earth elements are segregated near the grain boundaries by exchange between the heavy rare earth elements and Nd. Fluorine or light elements such as carbon, nitrogen, etc with a high diffusion speed in the solution that form a compound with the rare earth elements are detected near the grain boundaries.

It has been known that the rare earth elements form compounds with boron, nitrogen and oxygen; it is possible to perform the exchange reaction between the heavy rare earth elements and rare earth elements by utilizing the difference between free formation energy.

In order to improve magnetic characteristics of the sintered magnet as a whole, fluorine and the rare earth elements are diffused along the grain boundaries to segregate fluorine and the rare earth elements along the grain boundaries. The diffusion of the rare earth elements at the grain boundaries is assisted by the light elements that form compounds with fluorine and the rare earth elements. In case where the rare earth elements are diffused from the solution, the diffusion proceeds at low temperature such as 500 to 200° C. and the light elements diffuse along the grain boundaries to assist the diffusion of the rare earth elements because the contact between the solution and the sintered magnet is in face contact.

According to this phenomenon, it is possible to make small the crystal grains of fluorine compounds, rare earth element fluorine compounds or rare earth carbon acid fluorine compounds that grow along the grain boundaries.

In the case where a compound containing fluorine that grows in the surface of the sintered magnet has a fluorine content 50 atomic % or more, a resistance of the fluorine containing compounds is high. However, the content is less than 30 atomic %, the resistance reduces drastically. As a result, the high resistance of the surface of the sintered magnet becomes difficult. In order to increase the resistance by at least 50%, the heat-treatment temperature is set to 800° C. or lower to keep the fluorine content to 30% or less or the fluorine containing solution is coated at a thickness of 100 to 1000 nm, or a higher fluorine content solution is coated.

What is claimed is:

1. A magnet having a composition selected from the group consisting of NdFeB alloys, SmCo alloys and Fe—Co alloys, and containing a fluorine compound therein and having a lamellar grain boundary phase layer on a surface of a mother phase or at a lamellar grain boundary of the mother phase, the mother phase containing iron or cobalt, wherein the lamellar grain boundary phase layer has an electric resistivity of ten times or more that of the mother phase, a hardness of the lamellar grain boundary phase layer is smaller than that of the mother phase, and a concentration of oxygen in the mother phase and the lamellar grain boundary phase layer is 10 to 10000 ppm.

2. The magnet according to claim 1, wherein the lamellar grain boundary phase layer has a thickness of 10 to 1000 nm.

3. The magnet according to claim 1, wherein the lamellar grain boundary phase layer covers the surface of the mother phase.

4. The magnet according to claim 1, wherein the mother phase contains at least one of rare earth elements.

5. The magnet according to claim 1, wherein the mother phase contains at least one of rare earth elements and at least one of semimetal elements.

6. The magnet according to claim 1, wherein a residual magnetic flux density is at least 0.4 T.

7. The magnet according to claim 1, wherein the lamellar grain boundary phase is constituted a fluorine compound.

8. The magnet according to claim 7, wherein the fluorine compound is one constituted by fluorine and at least one selected from the group consisting of alkali metals, alkaline earth metals, transition metals and rare earth elements.

9. An electric rotating machine comprising:
   a stator constituting a plurality of slots and a plurality of teeth;
   a dynamo-winding wound around the teeth;
   a rotor disposed inside the stator; and
   the magnet according to claim 1, which is arranged on an outer periphery of the stator.

10. Magnetic powder having a composition selected from the group consisting of NdFeB alloys, SmCo alloys and Fe—Co alloys, and containing a fluorine compound therein, which has a lamellar grain boundary phase formed on a surface of a mother phase or on part of grain boundary of the mother phase, a resistance of the lamellar grain boundary phase is higher than the mother phase containing iron or cobalt by ten times or more, a hardness of the lamellar grain boundary phase is smaller than that of the mother phase.

11. The magnetic powder according to claim 10, wherein the lamellar grain boundary phase has a thickness of 10 to 10000 nm.

12. The magnetic powder according to claim 10, wherein the mother phase contains at least one rare earth elements.

13. The magnetic powder according to claim 10, wherein the mother phase contains at least one of rare earth elements and at least one of semimetal elements.

14. The magnetic powder according to claim 10, wherein the lamellar grain boundary phase is constituted by a fluorine compound.

15. The magnetic powder according to claim 14, wherein the fluorine compound is one constituted by fluorine and at least one selected from the group consisting of alkali metals, alkaline earth metals, transition metals and rare earth elements.

16. A magnetic circuit, which comprises:
   the magnetic powder comprising a hard magnetic material of the magnetic powder according to claim 10 and a soft magnetic material, wherein an eddy current loss of the hard magnetic material is smaller than that of the soft magnetic material, when an alternating current is applied to the soft magnetic material.

17. The magnet according to claim 1, wherein the magnet has a composition of NdFeB alloys whose main phase is $Nd_2Fe_{14}B$.

18. The magnetic powder according to claim 10, wherein the magnet has a composition of NdFeB alloys whose main phase is $Nd_2Fe_{14}B$.

19. The magnet circuit according to claim 16, wherein the magnet has a composition of NdFeB alloys whose main phase is $Nd_2Fe_{14}B$.

* * * * *